United States Patent
Brennan et al.

(10) Patent No.: US 11,686,026 B2
(45) Date of Patent: *Jun. 27, 2023

(54) METHODS FOR PRODUCING THROUGH-FLUID BONDED NONWOVEN WEBS

(71) Applicant: The Procter & Gamble Company, Cincinnati, OH (US)

(72) Inventors: Jonathan P. Brennan, Owensboro, KY (US); Jeffrey A. Auer, Cincinnati, OH (US); David Wesley Monebrake, Cincinnati, OH (US); Andreas J. Dreher, Cincinnati, OH (US); Antonius Lambertus DeBeer, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/550,218

(22) Filed: Dec. 14, 2021

(65) Prior Publication Data

US 2022/0098771 A1 Mar. 31, 2022

Related U.S. Application Data

(63) Continuation of application No. 16/695,252, filed on Nov. 26, 2019, now Pat. No. 11,236,448.

(Continued)

(51) Int. Cl.
D01D 5/22 (2006.01)
D01D 5/23 (2006.01)
(Continued)

(52) U.S. Cl.
CPC ............. D04H 3/10 (2013.01); D01D 5/08 (2013.01); D04H 3/011 (2013.01); D04H 3/03 (2013.01);
(Continued)

(58) Field of Classification Search
CPC .......... B29C 2791/006; B29D 99/0078; B29L 2031/726; B29L 2031/731; D01D 5/08;
(Continued)

(56) References Cited

U.S. PATENT DOCUMENTS 3,616,031 A  10/1971 Fleissner
4,089,720 A  5/1978 Haley
(Continued)

FOREIGN PATENT DOCUMENTS

CA  2378912 A1  2/2001
CN  1085972 A  4/1994
(Continued)

OTHER PUBLICATIONS

PCT Search Report and Written Opinion for PCT/US2019/063140 dated Mar. 12, 2020, 9 pages.
(Continued)

Primary Examiner — Leo B Tentoni
(74) Attorney, Agent, or Firm — Christian M. Best

(57) ABSTRACT

A method of creating a soft and lofty continuous fiber nonwoven web is provided. The method includes providing first and second, different molten polymers to a spinneret defining a plurality of orifices and flowing a fluid intermediate the spinneret and a moving porous member. The method includes using the fluid to draw the first and second molten polymers, in a direction toward the porous member, through at least some of the plurality of orifices to form a plurality of individual continuous fiber strands. The method includes depositing the continuous fiber strands onto the porous member at a first location to produce an intermediate continuous fiber nonwoven web, and intermittently varying, in at least two different zones, a vacuum force applied to the moving porous member and to the intermediate web down- (Continued)

stream of the first location and without the addition of more continuous fibers and without any heat applied.

30 Claims, 9 Drawing Sheets

Related U.S. Application Data

(60) Provisional application No. 62/773,227, filed on Nov. 30, 2018.

(51) Int. Cl.
| | |
|---|---|
| *D01D 5/28* | (2006.01) |
| *D01D 5/30* | (2006.01) |
| *D01D 5/32* | (2006.01) |
| *D01D 5/34* | (2006.01) |
| *D01D 5/36* | (2006.01) |
| *D01F 6/46* | (2006.01) |
| *D01F 6/92* | (2006.01) |
| *D01F 8/04* | (2006.01) |
| *D01F 8/06* | (2006.01) |
| *D01F 8/14* | (2006.01) |
| *D02G 1/00* | (2006.01) |
| *D04H 3/007* | (2012.01) |
| *D04H 3/147* | (2012.01) |
| *D04H 3/16* | (2006.01) |
| *D06C 7/00* | (2006.01) |
| *D04H 3/10* | (2012.01) |
| *D01D 5/08* | (2006.01) |
| *D04H 3/011* | (2012.01) |
| *D04H 3/03* | (2012.01) |
| *D04H 3/14* | (2012.01) |
| *B29D 99/00* | (2010.01) |
| *B29L 31/00* | (2006.01) |

(52) U.S. Cl.
CPC .......... *D04H 3/14* (2013.01); *B29C 2791/006* (2013.01); *B29D 99/0078* (2013.01); *B29L 2031/726* (2013.01); *B29L 2031/731* (2013.01); *D02G 1/004* (2013.01); *D10B 2321/021* (2013.01); *D10B 2321/022* (2013.01); *D10B 2331/04* (2013.01)

(58) Field of Classification Search
CPC .. D01D 5/22; D01D 5/23; D01D 5/28; D01D 5/30; D01D 5/32; D01D 5/34; D01D 5/36; D01F 6/46; D01F 6/92; D01F 8/04; D01F 8/06; D01F 8/14; D02G 1/00; D02G 1/004; D04H 3/007; D04H 3/011; D04H 3/14; D04H 3/147; D04H 3/16; D06C 7/00; D10B 2321/021; D10B 2321/022; D10B 2331/04
USPC .............. 264/101, 103, 168, 172.13, 172.14, 264/172.15, 172.17, 172.18, 211.13, 264/211.18, 211.2, 331.17, 331.21, 555; 156/167, 181
See application file for complete search history.

(56) References Cited

U.S. PATENT DOCUMENTS

| | | | |
|---|---|---|---|
| 4,097,965 A | 7/1978 | Gotchel et al. |
| 4,107,364 A | 8/1978 | Sisson |
| 4,940,502 A | 7/1990 | Marcus |
| 5,302,220 A | 4/1994 | Terakawa et al. |
| 5,382,400 A | 1/1995 | Pike et al. |
| 5,522,810 A | 6/1996 | Allen, Jr. et al. |
| 5,540,979 A | 7/1996 | Yahiaoui et al. |
| 5,575,874 A | 11/1996 | Griesbach, III |
| 5,599,420 A | 2/1997 | Yeo |
| 5,622,772 A | 4/1997 | Stokes et al. |
| 5,672,415 A | 9/1997 | Sawyer et al. |
| 5,874,159 A | 2/1999 | Cruise et al. |
| 6,066,221 A | 5/2000 | Marmon et al. |
| 6,319,455 B1 | 11/2001 | Kauschke et al. |
| 6,391,443 B1 | 5/2002 | Terada et al. |
| 6,454,989 B1 | 9/2002 | Neely et al. |
| 6,478,786 B1 | 11/2002 | Glaug et al. |
| 6,491,933 B2 | 12/2002 | Lorenzi et al. |
| 6,509,513 B2 | 1/2003 | Glaug et al. |
| 6,528,439 B1 | 3/2003 | Stokes et al. |
| H002062 H | 4/2003 | Blaney et al. |
| 6,576,575 B2 | 6/2003 | Griesbach, III |
| 6,588,080 B1 | 7/2003 | Neely et al. |
| 6,589,892 B1 | 7/2003 | Smith et al. |
| 6,592,697 B2 | 7/2003 | Pike et al. |
| 6,592,960 B1 | 7/2003 | Suzuki et al. |
| 6,613,704 B1 | 9/2003 | Arnold et al. |
| 6,627,025 B1 | 9/2003 | Yu |
| 6,642,429 B1 | 11/2003 | Carter et al. |
| 6,686,303 B1 | 2/2004 | Haynes et al. |
| 6,736,916 B2 | 5/2004 | Steinke et al. |
| 6,740,792 B2 | 5/2004 | Waldroup et al. |
| 6,777,056 B1 | 8/2004 | Boggs et al. |
| 6,781,027 B2 | 8/2004 | Fenwick et al. |
| 6,783,837 B1 | 8/2004 | Creagan et al. |
| 6,797,360 B2 | 9/2004 | Varona |
| 6,867,156 B1 | 3/2005 | White et al. |
| 6,869,670 B2 | 3/2005 | Delucia et al. |
| 6,877,246 B1 | 4/2005 | Hada et al. |
| 6,878,650 B2 | 4/2005 | Clark et al. |
| 6,887,423 B2 | 5/2005 | Van et al. |
| 6,911,174 B2 | 6/2005 | Creagan |
| 6,946,506 B2 | 9/2005 | Bond |
| 6,989,125 B2 | 1/2006 | Boney et al. |
| 6,998,164 B2 | 2/2006 | Neely et al. |
| 7,018,945 B2 | 3/2006 | Yahiaoui et al. |
| 7,045,211 B2 | 5/2006 | Fairbanks et al. |
| 7,056,891 B2 | 6/2006 | Resheski-wedepohl et al. |
| 7,172,801 B2 | 2/2007 | Hoying et al. |
| 7,179,247 B2 | 2/2007 | Mizutani et al. |
| 7,196,026 B2 | 3/2007 | Di |
| 7,247,215 B2 | 7/2007 | Schewe |
| 7,291,239 B2 | 11/2007 | Polanco et al. |
| 7,309,522 B2 | 12/2007 | Webb et al. |
| 7,413,803 B2 | 8/2008 | Jordan et al. |
| 7,425,517 B2 | 9/2008 | Deka et al. |
| 7,651,653 B2 | 1/2010 | Morman et al. |
| 7,674,058 B2 | 3/2010 | Berger et al. |
| 7,922,849 B2 | 4/2011 | Sommer et al. |
| 7,943,813 B2 | 5/2011 | Petryk et al. |
| 7,989,062 B2 | 8/2011 | Chakravarty et al. |
| 7,998,384 B2 | 8/2011 | Gillespie et al. |
| 8,093,161 B2 | 1/2012 | Bansal |
| 8,148,279 B2 | 4/2012 | Anantharamaiah et al. |
| 8,236,385 B2 | 8/2012 | Yahiaoui et al. |
| 8,240,484 B2 | 8/2012 | Fox et al. |
| 8,314,286 B2 | 11/2012 | Drzewiecki et al. |
| 8,410,005 B2 | 4/2013 | Brennan et al. |
| 8,420,557 B2 | 4/2013 | Haberer et al. |
| 8,426,671 B2 | 4/2013 | Steffen et al. |
| 8,440,123 B2 | 5/2013 | Hanson et al. |
| 8,440,286 B2 | 5/2013 | Curro et al. |
| 8,518,311 B2 | 8/2013 | He et al. |
| 8,569,569 B2 | 10/2013 | Zhang et al. |
| 8,669,410 B2 | 3/2014 | Weismantel et al. |
| 8,710,293 B2 | 4/2014 | Zhang et al. |
| 8,721,827 B2 | 5/2014 | Chang et al. |
| 8,895,800 B2 | 11/2014 | Weismantel et al. |
| 8,906,815 B2 | 12/2014 | Moore et al. |
| 8,932,704 B2 | 1/2015 | Porbeni et al. |
| 9,029,277 B2 | 5/2015 | Ngai |
| 9,073,040 B2 | 7/2015 | Dobrawa et al. |
| 9,089,624 B2 | 7/2015 | Whitmore et al. |
| 9,163,336 B2 | 10/2015 | He et al. |
| 9,194,065 B2 | 11/2015 | Moore et al. |

(56) References Cited

U.S. PATENT DOCUMENTS

| | | | |
|---|---|---|---|
| 9,237,973 B2 | 1/2016 | Abuto et al. |
| 9,259,059 B2 | 2/2016 | Horn et al. |
| 9,416,485 B2 | 8/2016 | Moore et al. |
| 9,480,968 B2 | 11/2016 | Weismantel et al. |
| 9,539,357 B2 | 1/2017 | Ashraf et al. |
| 9,540,746 B2 | 1/2017 | Ashraf et al. |
| 2001/0041876 A1 | 11/2001 | Creagan et al. |
| 2002/0019206 A1 | 2/2002 | Deka et al. |
| 2002/0090499 A1 | 7/2002 | Shelley et al. |
| 2002/0177829 A1 | 11/2002 | Fell |
| 2003/0027977 A1 | 2/2003 | Koning et al. |
| 2003/0045192 A1 | 3/2003 | Midkiff et al. |
| 2003/0056883 A1 | 3/2003 | Bansal et al. |
| 2003/0068947 A1 | 4/2003 | Marmon et al. |
| 2003/0082340 A1 | 5/2003 | Mccabe et al. |
| 2003/0082977 A1 | 5/2003 | Kuroiwa et al. |
| 2003/0087574 A1 | 5/2003 | Latimer et al. |
| 2003/0104748 A1 | 6/2003 | Brown et al. |
| 2003/0114066 A1 | 6/2003 | Clark et al. |
| 2003/0116259 A1 | 6/2003 | Sayovitz et al. |
| 2003/0118816 A1 | 6/2003 | Polanco et al. |
| 2003/0203162 A1 | 10/2003 | Fenwick |
| 2003/0213109 A1 | 11/2003 | Neely et al. |
| 2004/0005457 A1 | 1/2004 | Delucia et al. |
| 2004/0038612 A1 | 2/2004 | Forbes et al. |
| 2004/0110442 A1 | 6/2004 | Rhim |
| 2004/0116018 A1 | 6/2004 | Fenwick et al. |
| 2004/0121680 A1 | 6/2004 | Yahiaoui et al. |
| 2004/0122396 A1 | 6/2004 | Maldonado et al. |
| 2004/0170836 A1 | 9/2004 | Bond |
| 2004/0224136 A1 | 11/2004 | Collier et al. |
| 2004/0236297 A1 | 11/2004 | Drzewiecki et al. |
| 2004/0254555 A1 | 12/2004 | Wang et al. |
| 2005/0020170 A1 | 1/2005 | Deka et al. |
| 2005/0077646 A1 | 4/2005 | Akiba et al. |
| 2005/0079785 A1 | 4/2005 | Bond |
| 2005/0087288 A1 | 4/2005 | Haynes et al. |
| 2005/0095943 A1 | 5/2005 | Griffin et al. |
| 2005/0104261 A1 | 5/2005 | Allen et al. |
| 2005/0118916 A1 | 6/2005 | Ducker et al. |
| 2005/0136242 A1 | 6/2005 | Yahiaoui et al. |
| 2005/0136773 A1 | 6/2005 | Yahiaoui |
| 2005/0197027 A1 | 9/2005 | Crane et al. |
| 2005/0227563 A1 | 10/2005 | Bond |
| 2005/0244619 A1 | 11/2005 | Kauschke et al. |
| 2005/0245157 A1 | 11/2005 | Kepner et al. |
| 2005/0245158 A1 | 11/2005 | Yahiaoui et al. |
| 2005/0245162 A1 | 11/2005 | Ng et al. |
| 2005/0256476 A1 | 11/2005 | Mirle et al. |
| 2005/0260914 A1 | 11/2005 | Oathout |
| 2006/0027944 A1 | 2/2006 | Bentley et al. |
| 2006/0141217 A1 | 6/2006 | Ellis et al. |
| 2007/0026753 A1 | 2/2007 | Neely |
| 2007/0098768 A1 | 5/2007 | Close et al. |
| 2007/0141303 A1 | 6/2007 | Steindorf |
| 2008/0000057 A1 | 1/2008 | Nguyen |
| 2008/0003906 A1 | 1/2008 | Hill et al. |
| 2008/0038976 A1 | 2/2008 | Berrigan et al. |
| 2008/0086105 A1 | 4/2008 | Sour |
| 2008/0118727 A1 | 5/2008 | Andersen |
| 2008/0210363 A1 | 9/2008 | Sommer et al. |
| 2009/0076472 A1 | 3/2009 | Goldwasser et al. |
| 2009/0142595 A1 | 6/2009 | Matsui et al. |
| 2010/0159770 A1 | 6/2010 | Walser et al. |
| 2010/0174260 A1 | 7/2010 | Di et al. |
| 2010/0310845 A1 | 12/2010 | Bond et al. |
| 2010/0323575 A1 | 12/2010 | He et al. |
| 2011/0003524 A1 | 1/2011 | Claasen et al. |
| 2011/0076907 A1 | 3/2011 | Glew et al. |
| 2011/0123802 A1 | 5/2011 | Chang et al. |
| 2011/0144608 A1 | 6/2011 | Kim et al. |
| 2011/0179558 A1 | 7/2011 | Lyons |
| 2011/0250378 A1 | 10/2011 | Eaton |
| 2012/0004632 A1 | 1/2012 | Zhang et al. |
| 2012/0040185 A1 | 2/2012 | Topolkaraev et al. |
| 2013/0004552 A1 | 1/2013 | Pedoja |
| 2013/0023608 A1 | 1/2013 | Kellett et al. |
| 2013/0053479 A1 | 2/2013 | Bond et al. |
| 2013/0096526 A1 | 4/2013 | Schroeder et al. |
| 2013/0210308 A1 | 8/2013 | Mceneany et al. |
| 2013/0309932 A1 | 11/2013 | He et al. |
| 2014/0138584 A1 | 5/2014 | Bond et al. |
| 2014/0142225 A1 | 5/2014 | Bond et al. |
| 2014/0142226 A1 | 5/2014 | Bond et al. |
| 2014/0142232 A1 | 5/2014 | Bond et al. |
| 2014/0142233 A1 | 5/2014 | Layman et al. |
| 2014/0145374 A1 | 5/2014 | Altonen et al. |
| 2014/0272362 A1 | 9/2014 | Dugan et al. |
| 2014/0296388 A1 | 10/2014 | Bond et al. |
| 2014/0378922 A1 | 12/2014 | Fuchs et al. |
| 2015/0004866 A1 | 1/2015 | Scholz et al. |
| 2015/0017411 A1 | 1/2015 | Wilkie et al. |
| 2015/0137413 A1 | 5/2015 | Bond et al. |
| 2015/0173975 A1 | 6/2015 | Harumoto et al. |
| 2015/0211157 A1 | 7/2015 | Okuda et al. |
| 2015/0211158 A1 | 7/2015 | Hassan et al. |
| 2015/0322601 A1 | 11/2015 | Brown et al. |
| 2016/0040337 A1 | 2/2016 | Dutkiewicz et al. |
| 2016/0101208 A1 | 4/2016 | Topolkaraev et al. |
| 2016/0151213 A1 | 6/2016 | Bauduin et al. |
| 2016/0206772 A1 | 7/2016 | Schröder et al. |
| 2016/0222558 A1 | 8/2016 | Hofemeister et al. |
| 2016/0251788 A1 | 9/2016 | Huang et al. |
| 2016/0263271 A1 | 9/2016 | Huang et al. |
| 2017/0144405 A1 | 5/2017 | Liu et al. |
| 2017/0211216 A1 | 7/2017 | Brown et al. |
| 2017/0314163 A1 | 11/2017 | Sommer et al. |
| 2018/0002850 A1 | 1/2018 | Hansen et al. |
| 2019/0316284 A1 | 10/2019 | Hansen et al. |
| 2020/0170853 A1 | 6/2020 | Brennan et al. |
| 2020/0173075 A1 | 6/2020 | Xu et al. |
| 2020/0173077 A1 | 6/2020 | Brennan et al. |
| 2020/0173078 A1 | 6/2020 | Xu |
| 2021/0214870 A1 | 7/2021 | Cinquemani et al. |
| 2022/0298687 A1 | 9/2022 | Xu et al. |

FOREIGN PATENT DOCUMENTS

| | | |
|---|---|---|
| CN | 1131214 A | 9/1996 |
| CN | 1207667 A | 2/1999 |
| CN | 1207779 A | 2/1999 |
| CN | 1331766 A | 1/2002 |
| CN | 1582224 A | 2/2005 |
| CN | 1934296 A | 3/2007 |
| CN | 1993505 A | 7/2007 |
| CN | 101956295 A | 1/2011 |
| CN | 101990586 A | 3/2011 |
| CN | 102482819 A | 5/2012 |
| CN | 104711764 | 6/2015 |
| CN | 105463699 B | 4/2016 |
| CN | 106795670 A | 5/2017 |
| CN | 107227559 A | 10/2017 |
| CN | 107326541 A | 11/2017 |
| CN | 207175103 U | 4/2018 |
| CN | 108349222 A | 7/2018 |
| DE | 102011050328 B3 | 6/2012 |
| EP | 0665315 A1 | 8/1995 |
| JP | H07216710 A | 8/1995 |
| JP | H10280267 A | 10/1998 |
| JP | 2004511670 A | 4/2004 |
| JP | 2010156076 A | 7/2010 |
| WO | 9721863 A2 | 6/1997 |
| WO | 0112888 A1 | 2/2001 |
| WO | 0174281 A1 | 10/2001 |
| WO | 2005001188 A1 | 1/2005 |
| WO | 2008087193 A2 | 7/2008 |

OTHER PUBLICATIONS

All Office Actions; U.S. Appl. No. 16/695,252, filed on Nov. 26, 2019.

All Office Actions; U.S. Appl. No. 16/695,258, filed on Nov. 26, 2019.

(56) References Cited

OTHER PUBLICATIONS

Extended EP Search Report and Written Opinion for 22177738.6 dated Sep. 16, 2022, 8 Pages.
All Office Actions; U.S. Appl. No. 16/695,248, filed on Nov. 26, 2019.
All Office Actions; U.S. Appl. No. 16/695,441; filed on Nov. 26, 2019.
All Office Actions; U.S. Appl. No. 17/830,416, filed on Jun. 2, 2022.
All Office Actions; U.S. Appl. No. 18/095,066, filed on Jan. 10, 2023.
Unpublished U.S. Appl. No. 18/095,066, filed on Jan. 10, 2023, to Han Xu.

METHODS FOR PRODUCING THROUGH-FLUID BONDED NONWOVEN WEBS

CROSS REFERENCE TO RELATED APPLICATIONS

This application is a continuation of, and claims priority under 35 U.S.C. § 120 to, U.S. patent application Ser. No. 16/695,252, filed on Nov. 26, 2019, now granted U.S. Pat. No. 11,236,448, issued on Feb. 1, 2022, which claims the benefit, under 35 U.S.C. § 119(e), of U.S. Provisional Patent Application Ser. No. 62/773,227, filed on Nov. 30, 2018, the entire disclosures of both of which are fully incorporated by reference herein.

FIELD

The present disclosure is generally directed to methods for producing through-fluid bonded nonwoven webs, and is more particularly directed to, methods for producing through-fluid bonded continuous fiber nonwoven webs.

BACKGROUND

Nonwoven webs may comprise continuous fibers. The continuous fibers may be manufactured by a continuous fiber nonwoven manufacturing operation. The continuous fibers may comprise multi-constituent fibers, such as bicomponent fibers, for example. In the manufacturing operation, continuous fiber strands of molten polymer may be drawn or pushed downwardly from a spinneret by a fluid, such as air, toward a moving porous member, such as a moving porous belt. During the drawing or pushing, the continuous fiber strands may be quenched and stretched. Once the continuous fibers are deposited on the moving porous member, they may be formed into an intermediate continuous fiber nonwoven web and may be conveyed downstream facilitated by various methods of control for final bonding to produce a finished continuous fiber nonwoven web. An "intermediate continuous fiber nonwoven web" as used herein means a web that has not yet been finally bonded. After the continuous fiber strands are quenched and stretched the continuous fiber strands may bend, curl, and/or twist once tension on a continuous fiber strand applied either by the stretching, air or moving porous member vacuum, has been removed. This is referred to as "self-crimping." The amount of bend, curl, and/or twist may be varied based on composition as well as quenching and stretching process conditions. Under the right process conditions, continuous fiber strands with a high degree of crimping may be used to form an unbonded and lofty continuous fiber nonwoven web on the moving porous member. However, if the continuous fiber strands are allowed to self-crimp too much before final bonding, the intermediate continuous fiber nonwoven web may fail to have sufficient integrity to be conveyed reliably on the moving porous member or become non-uniform in formation with a significant reduction in strength and softness or other properties in addition to having an undesirable non-uniform appearance.

Current approaches to limit and control the loft generated by the self-crimping fibers typically includes a heated compaction process step or pre-bonding via a hot air knife prior to through-fluid bonding. However, in these approaches the lofting and softness potential of the self-crimping fibers may be reduced. In order to achieve better loft, strength, softness, and entanglement of the continuous fibers, conventional methods of producing continuous fiber nonwoven webs should be improved.

SUMMARY

The present disclosure solves the problems addressed above and provides methods of producing continuous fiber nonwoven webs that have improved loft, strength, and softness, via improved continuous fiber entanglement and through-fluid bonding. The present disclosure teaches that intermittently applying vacuum (e.g., turn on/off, apply/reduce) to portions of a moving porous member where the continuous fibers are laid down allows the continuous fibers to reorient relative to each other (i.e., better entangle) as the vacuum is turned off or reduced. Continuous fiber entanglement may increase the z-direction resilience of the nonwoven web for improved loft and softness after through-fluid bonding. Vacuum may be turned on/off as many times in zones along the moving porous member as necessary to achieve desirable fiber entanglement. This may comprise turning the vacuum on/off (or apply/reduce) as many as 15 times, as many as 10 times, as many as 7 times, as many as 5 times, as many as 4 times, as many as 3 times, as many as 2 times, or just 1 time, for example. Instead of turning the vacuum off, the vacuum may instead merely be intermittently reduced. Stated another way, the vacuum force applied to the moving porous member and the intermediate continuous fiber nonwoven web may be a first force in certain zones and a second force in certain other zones, wherein the first force is greater than the second force. Instead of turning the vacuum on/off or varying the vacuum force, a vacuum diverter may be positioned to block vacuum from contacting the intermediate continuous fiber nonwoven web in certain zones of the moving porous member. The vacuum diverter may define zones of apertures where a fluid may apply a vacuum force to the web and other zones of non-apertures where the fluid cannot apply a vacuum force to the web. The zones of apertures may be varied in a machine direction or in a cross-machine direction. The reorienting of the continuous fibers may be aided by the fibers being crimped fibers. Crimping may occur more in zones where the vacuum is reduced, blocked, or off. Once the continuous fibers are reoriented, they may be through-fluid bonded on at least one side to produce a strong web with less fuzz, but that is still quite lofty and soft. Prior to the through-fluid bonding, the intermediate continuous fiber nonwoven web may also be intermittently heated and/or cooled with air or other mechanisms to again promote further reorienting of the continuous fibers within the web. This may improve continuous fiber contact points within the web and/or increase the entanglement of the continuous fibers in the web before final through-fluid bonding. This may comprise heating and cooling the nonwoven web above and below the glass transition temperature of at least one of the continuous fiber's constituent polymers. This again may lead to improved loft and softness and improved through-fluid bonding leading to better structural integrity in the web.

During the through-fluid bonding process, while the temperature of the continuous fibers is increasing, but prior to fiber-to-fiber bonding, the continuous fibers may crimp more and/or reorient further thereby increasing the loft of the unbonded nonwoven web. This may also be accomplished via a separate pre-heating step.

While through-fluid bonding is desirable, other means of thermal bonding such as thermal point bonding may also provide improved loft and softness. Combinations of through-fluid bonding and thermal point bonding may also be desirable.

BRIEF DESCRIPTION OF THE DRAWINGS

The above-mentioned and other features and advantages of the present disclosure, and the manner of attaining them, will become more apparent and the disclosure itself will be better understood by reference to the following description of example forms of the disclosure taken in conjunction with the accompanying drawings, wherein.

DETAILED DESCRIPTION

Figure 1:
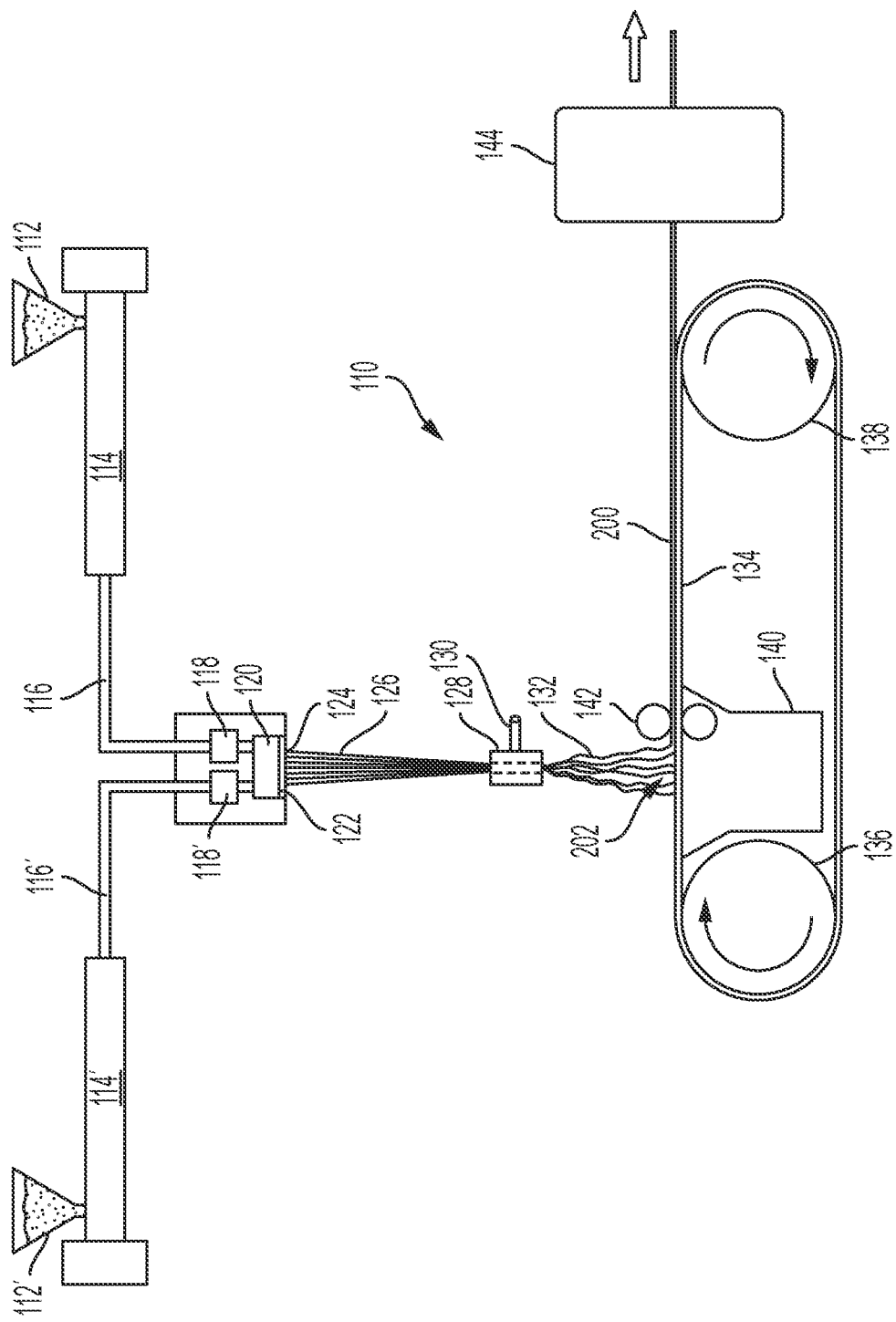
FIG. 1 is a diagrammatic view of an apparatus for performing a process for producing a through-fluid bonded continuous fiber nonwoven web comprising thermal point bonding.

Various non-limiting forms of the present disclosure will now be described to provide an overall understanding of the principles of the structure, function, manufacture, and use of the Methods for Producing Through-Fluid Bonded Nonwoven Webs disclosed herein. One or more examples of these non-limiting forms are illustrated in the accompanying drawings. Those of ordinary skill in the art will understand that the Methods for Producing Through-Fluid Bonded Nonwoven Webs described herein and illustrated in the accompanying drawings are non-limiting example forms and that the scope of the various non-limiting forms of the present disclosure are defined solely by the claims. The features illustrated or described in connection with one non-limiting form may be combined with the features of other non-limiting forms. Such modifications and variations are intended to be included within the scope of the present disclosure.

Nonwoven Webs

Nonwoven webs are useful in many industries, such as the hygiene industry, the dusting and cleaning implement industry, and the healthcare industry, for example. In the hygiene industry, nonwoven webs are used in the absorbent article field, such as use as components in diapers, pants, adult incontinence products, tampons, sanitary napkins, absorbent pads, bed pads, wipes, and various other products. Nonwoven webs may be used in diapers, pants, adult incontinence products, and/or sanitary napkins, for example, as topsheets, outer cover nonwoven materials, portions of leg cuffs, acquisition materials, core wrap materials, portions of ears and side panels, portions of fastener tabs, and/or secondary topsheets, for example. The nonwoven webs of the present disclosure are not limited to any certain industry or application, but can have application across many industries and applications.

Fiber Composition

The fibers of the nonwoven webs of the present disclosure may comprise multi-constituent fibers, such as bicomponent fibers or tri-component fibers, for example, mono-component fibers, and/or other fiber types. Multi-constituent fibers, as used herein, means fibers comprising more than one chemical species or material (i.e., multi-component fibers). Bicomponent fibers are used in the present disclosure merely as an example of multi-constituent fibers. The fibers may have round, triangular, tri-lobal, or otherwise shaped cross-sections, for example. It may be desirable to have fibers comprising more than one polymer component, such as bicomponent fibers. Often, these two polymer components have different melting temperatures, viscosities, glass transition temperatures, and/or crystallization rates. As the bicomponent fibers cool after formation, one polymer component may solidify and/or shrink at a faster rate than the other polymer component, deforming the fiber, causing increased bending in the fiber when tension on the fiber is relieved, and thereby causing what is known as "crimp" in the fibers. Crimp of the fibers aids in the softness and loft of a nonwoven web, which is consumer desirable. Examples of bicomponent fibers may comprise a first polymer component having a first melting temperature and a second polymer component having a second melting temperature. The first melting temperature of the first polymer component may be about 10 degrees C. to about 180 degrees C., or about 30 degrees C. to about 150 degrees C., different than the second melting temperature of the second polymer component, thereby causing crimping of the fibers during cooling, specifically reciting all 0.1 degree C. increments within the specified ranges and all ranges formed therein or thereby. The first and second melting temperatures may differ by at least 10 degrees C., at least 25 degrees, at least 40 degrees C., at least 50 degrees C., at least 75 degrees C., at least 100 degrees C., at least 125 degrees C., at least 150 degrees C., but all less than 180 degrees C., for example. As a further example, a first polymer component may comprise polypropylene and a second polymer component may comprise polyethylene. As yet another example, a first polymer component may comprise polyethylene and a second polymer component may comprise polyethylene terephthalate. As yet another example, a first polymer component may comprise polyethylene and a second polymer component may comprise polylactic acid. If tri-component fibers are used, at least one polymer component may have a different melting temperature (in the ranges specified above) than a melting temperature of at least one of the other two polymer components. The fibers may comprise natural resins, synthetic resins, polylactic acid resins, recycled resins, and/or biobased resins. The fibers may be or may comprise continuous fibers or spun fibers. Carded staple fibers may also be within the scope of the methods of the present disclosure. The multi-constituent fibers, such as bicomponent fibers, may comprise sheath/core, side-by-side, islands in the sea, and/or eccentric configurations or may have other configurations.

Using thinner fibers may help through-fluid bonding intermediate continuous fiber nonwoven webs to produce continuous fiber nonwoven webs. For example, the continuous fibers may have a decitex in the range of about 0.5 to about 15, about 0.5 to about 10, about 0.5 to about 5, about 0.8 to about 4, about 0.8 to about 3, about 0.8 to about 2, about 0.8 to about 1.5, about 1 to about 1.4, about 1.1 to about 1.3, or about 1.2, specifically reciting all 0.1 decitex increments within the specified ranges and all ranges formed therein or thereby.

General Continuous Fiber Nonwoven Formation Process

Many nonwoven webs are made from melt-spinnable polymers and are produced using a spunbond process. The term "spunbond" refers to a process of forming a nonwoven web from thin continuous fibers produced by extruding molten polymers from orifices of a spinneret. The continuous fibers are drawn as they cool (e.g., by an aspirator, positioned below the spinneret, which longitudinally stretches and transversely attenuates the fibers) and are randomly laid on a moving porous member, such as a moving porous belt, such that the continuous fibers form an intermediate continuous fiber nonwoven web. The intermediate continuous fiber nonwoven web is subsequently bonded using one of several known techniques, such as thermal point bonding or air through bonding, for example, to form the nonwoven web. Spunbonding processes, however, result in low loft and softness in produced nonwoven webs due to the heavy thermal point bonding and reduced ability for the fibers to crimp on the moving porous member.

FIG. 1 diagrammatically illustrates an example apparatus 110 for producing continuous fiber nonwoven webs. The apparatus 110 may comprise a hopper 112 into which pellets of a solid polymer may be placed. The polymer may be fed from the hopper 112 to a screw extruder 114 that melts the polymer pellets. The molten polymer may flow through a heated pipe 116 to a metering pump 118 that in turn feeds the polymer stream to a suitable spin pack 120. The spin pack 120 may comprise a spinneret 122 defining a plurality of orifices 124 that shape the fibers extruded therethrough. The orifices may be any suitable shape, such as round, for example. If bicomponent fibers are desired, another hopper 112', another screw extruder 114', another heated pipe 116', and another metering pump 118' may be included to feed a second polymer to the spinneret 122. The second polymer may be the same as or different than the first polymer. In some instances, the second polymer may be a different material and may have a different melting temperature as the first polymer as discussed herein. This difference in melting temperature allows formed bicomponent fibers to crimp on the moving porous member as discussed herein. More than two polymer feed systems may also be included if a 3 or more polymer components are desired.

Referring again to FIG. 1, an array of continuous fiber strands 126 may exit the spinneret 122 of the spin pack 120 and may be pulled downward by a drawing unit or aspirator 128, which may be fed by a fluid, such as compressed air or steam, from a conduit or other fluid source 130. Specifically, the aspirator 128 uses fluid pressure or air pressure to form a fluid flow or air flow directed generally downward toward the moving porous member, which creates a downward fluid drag or air drag on the continuous fibers, thereby increasing the velocity of the portion of the continuous fiber strands in and below the aspirator relative to the velocity of the portion of the continuous fibers above the aspirator. The downward drawing of the continuous fibers longitudinally stretches and transversely attenuates the continuous fibers. The aspirator 128 may be, for example, of the gun type or of the slot type, extending across the full width of the continuous fiber array, i.e., in the direction corresponding to a width of the intermediate nonwoven web to be formed by the continuous fibers. The area between the spinneret 122 and the aspirator 128 may be open to ambient air (open system) as illustrated or closed to ambient air (closed system).

The aspirator 128 delivers the attenuated continuous fiber strands 132 onto a moving porous member 134, such as a screen-type forming belt, which may be supported and driven by rolls 136 and 138 or other mechanisms. A suction box 140 may provide a negative fluid pressure to the moving porous member 134 and the intermediate continuous fiber nonwoven web on the moving porous member 134. For example, the suction box 140 may be connected to a fan to pull room air (at the ambient temperature) through the moving porous member 134, causing the continuous fibers 132 to form an intermediate continuous fiber nonwoven web 200 on moving porous member 134. The intermediate continuous fiber nonwoven web 200 passes through a thermal point bonding unit 142 or a through-air fluid bonding unit to provide the web 200 with structural integrity as it travels downstream of the first location 202. The intermediate continuous fiber nonwoven web 200 may then be conveyed on the moving porous member 134 or other conveyer or belt into a through-fluid bonding oven 144.

The moving porous member 134 may be a structured forming belt with a resin disposed thereon, as described in U.S. Pat. No. 10,190,244, issued on Jan. 29, 2019, to Ashraf et al. The moving porous member 134 may be a SupraStat 3601 belt from Albany International Corp.

Example materials are contemplated where the first and/or second polymers of the bicomponent continuous fibers comprise additives in addition to their constituent chemistry. For example, suitable additives include additives for coloration, antistatic properties, lubrication, softness, hydrophilicity, hydrophobicity, and the like, and combinations thereof. Silky additives may also be used such as an amide family additive, a steric acid, a functionalized siloxane, and/or a wax, for example. These additives, for example titanium dioxide for coloration, may generally be present in an amount less than about 5 weight percent and more typically less than about 2 weight percent or less by total weight of the fibers.

In order to allow better continuous fiber crimping on the moving porous member 134, and thereby promote improved softness, loft, and fiber reorientation, the present inventors have determined that applying variable or intermittent vacuum forces to the intermediate continuous fiber nonwoven in different zones (machine direction zones or cross-machine direction zones) of the moving porous member 134 is desired. The variable or intermittent vacuum forces may be on/off. Alternatively, the variable or intermittent vacuum forces may be a first vacuum force and a second smaller vacuum force. In any event, when the vacuum forces applied to the intermediate continuous fiber nonwoven web are turned off or reduced, the web is allowed to relax or partially relax, leading to continuous fiber reorientation occurring and nonwoven web thickening in the z-direction. Turning the vacuum force on/off, or first vacuum force/second smaller vacuum force multiple times, provides improved benefits for nonwoven web stability and strength from fiber crimping and fiber reorientation before through-fluid bonding. These variable or intermittent vacuum supplying steps provide soft and lofty intermediate continuous fiber nonwoven webs with improved continuous fiber reorientation for better structural integrity. By improved continuous fiber reorientation, it is meant that the continuous fibers are more entangled with each other and have improved continuous fiber crimping. In the off vacuum zones, a positive fluid pressure may be applied to the web to aid in providing loft and softness to the web.

Vacuum forces may be quantified by measuring the vacuum air velocity with and anemometer, such as Extech CFM/CMM Thermo-Anemometer (Part #407113), for example. To measure the air velocity, the Thermo-Anemometer is placed above and in contact with the moving porous member in the absence of the nonwoven web and with the moving porous member stopped. The vacuum forces and their corresponding velocities may depend on a number of factors, such as vacuum zone length or size, moving porous member speed (when running), fiber composition, and/or basis weight. Air velocities may be high enough to substantially collapse the lofted structure but allow it to transfer smoothly across the vacuum zone without breaking apart. For example, vacuum air velocities may be as high as 10 m/s, as high as 5 m/s, as high as 4 m/s, as high as 3 m/s, as high as 2 m/s, or as high as 1 m/s. The machine direction length of the vacuum zones may depend on a number of factors, such as vacuum air velocity, moving porous member speed (when running), fiber composition, and/or basis weight. Air vacuum zones may be large enough to substantially collapse the lofted web structure, but still allow the lofted web structure to transfer smoothly across the vacuum zone without breaking apart. For example, air vacuum zone machine direction lengths may be as high as 20 cm, as high as 10 cm, as high as 5 cm, as high as 2.5 cm or as high as 1 cm, for example.

Figure 2:
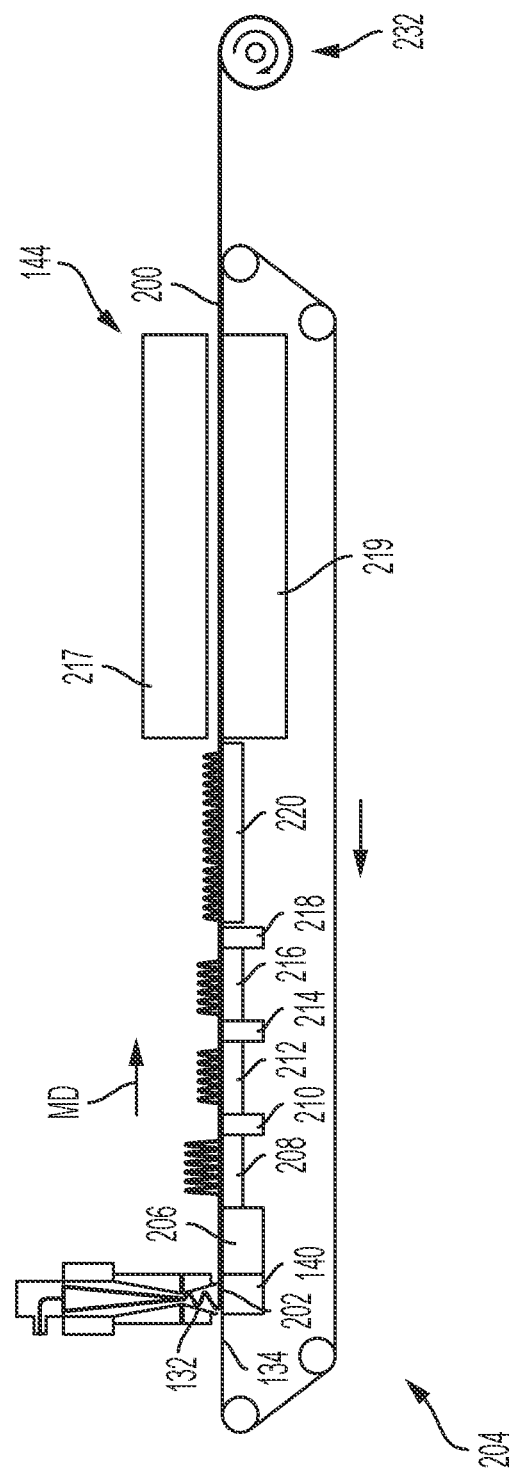
FIG. 2 is a diagrammatic view of an apparatus for performing a process for producing a through-fluid bonded continuous fiber nonwoven web where vacuum forces are intermittently applied to the web.

Referring to FIG. 2, an apparatus 204 for producing a continuous fiber nonwoven web 200 is illustrated. The general process of creating continuous fiber strands 132 and depositing them on a moving porous member 134 is described above with respect to FIG. 1 and will not be repeated here for brevity. The continuous fibers may comprise bicomponent fibers having a first polymer and a second polymer. The first polymer may have a first melting temperature and the second polymer may have a second melting temperature. The first melting temperature may be different than the second melting temperature in the range of about 10 degrees to about 180 degrees, or about 30 degrees to about 150 degrees, including the other ranges specified herein. This difference in melting temperatures of the polymers causes the continuous fibers to crimp during fiber cooling. Crimping promotes loft, softness, and fiber reorientation in a nonwoven web, which are all desirable properties. The more the continuous fibers are allowed to crimp on the moving porous member 134 during cooling, the better loft, softness, and fiber reorientation the nonwoven web may achieve.

As discussed with respect to FIG. 1, the continuous fiber strands 132 are deposited on the moving porous member 134 at a first location 202 to form an intermediate continuous fiber nonwoven web 200. The intermediate continuous fiber nonwoven web 200 is then conveyed by the moving porous member 134 downstream (i.e., in the machine direction or MD) toward a through-fluid bonding oven 144. This same concept applies to FIG. 2, as indicated by the reference numbers in FIG. 2. Once the web 200 is conveyed downstream of the vacuum box 140, it may experience variable or intermittent vacuum forces prior to being conveyed into the through-fluid bonding oven 144. These variable or intermittent vacuum forces applied to the web may occur without the addition of any more continuous fibers on the moving porous member 134 and without any additional heat being applied. The moving porous member 134 may be conveyed on rollers, for example. It is noted that any of the "moving porous members" disclosed herein may have sections or portions that are not porous, but at least some sections or portions of the moving porous members are able to have a fluid flow therethrough.

As an example, the web 200 may be conveyed through a first zone 206 downstream of the first location 202 and downstream of the vacuum box 140, a second zone 208 downstream of the first zone 206, a third zone 210 downstream of the second zone 208, and a fourth zone 212 downstream of the third zone 210 prior to being conveyed into the through-fluid bonding oven 144. In some instances, the web 200 may also be conveyed through a fifth zone 214 downstream of the fourth zone 212 and a sixth zone 216 downstream of the fifth zone 214 before being conveyed into the through-fluid bonding oven 144. In still other instances, the web 200 may also be conveyed through a seventh zone 218 downstream of the sixth zone 216 and an eighth zone 220 downstream of the seventh zone 218 prior to being conveyed into the through-fluid bonding oven 144. Any suitable number of zones of intermittent or variable vacuum may be used within reason based on a footprint of a nonwoven manufacturing line. For example, 10 different zones may be used, 15 different zones may be used, or 20 different zones may be used. Further, the zones may not always be staggered as on/off or first vacuum force/second smaller vacuum force. Instead, multiple zones of no or reduced vacuum may be positioned together. For example, two zones of no or reduced vacuum may be positioned together with single zones of vacuum surrounding them.

Still referring to FIG. 2, a first vacuum force may be applied to the intermediate continuous fiber nonwoven web 200 to the first zone 206, the third zone 210, and fifth zone 214, and/or the seventh zone 218 or more zones, if provided. A second vacuum force may be applied to the intermediate continuous fiber nonwoven web 200 in the second zone 208, the fourth zone 212, the sixth zone 216, and/or the eighth zone 220 or more zones, if provided. The second vacuum force may be about zero, zero, or may merely be less than the first vacuum force. In any event, the intermittent or variable cycling of the vacuum force (whether on/off or merely reduced) applied to the intermediate continuous fiber nonwoven web 200 allows the continuous fibers to relax, crimp, and reorient leading to improved loft, softness, and structural integrity.

The various zones may all have the same machine directional lengths or may have different machine directional lengths. For example, the zones receiving vacuum forces may have shorter machine directional lengths than the zones not receiving vacuum forces or receiving reduced vacuum forces (see e.g., FIG. 3). In other instances, the zones receiving no vacuum forces or receiving reduced vacuum forces may have shorter machine directional lengths than the zones receiving vacuum forces. The various zones may all have the same cross-machine directional lengths or may have different cross-machine directional lengths. In some instances, a single zone may provide the web 200 with a first vacuum force in a first area and a second different vacuum force in a second area. The second different vacuum force may be about zero or may merely be different.

Figure 3:
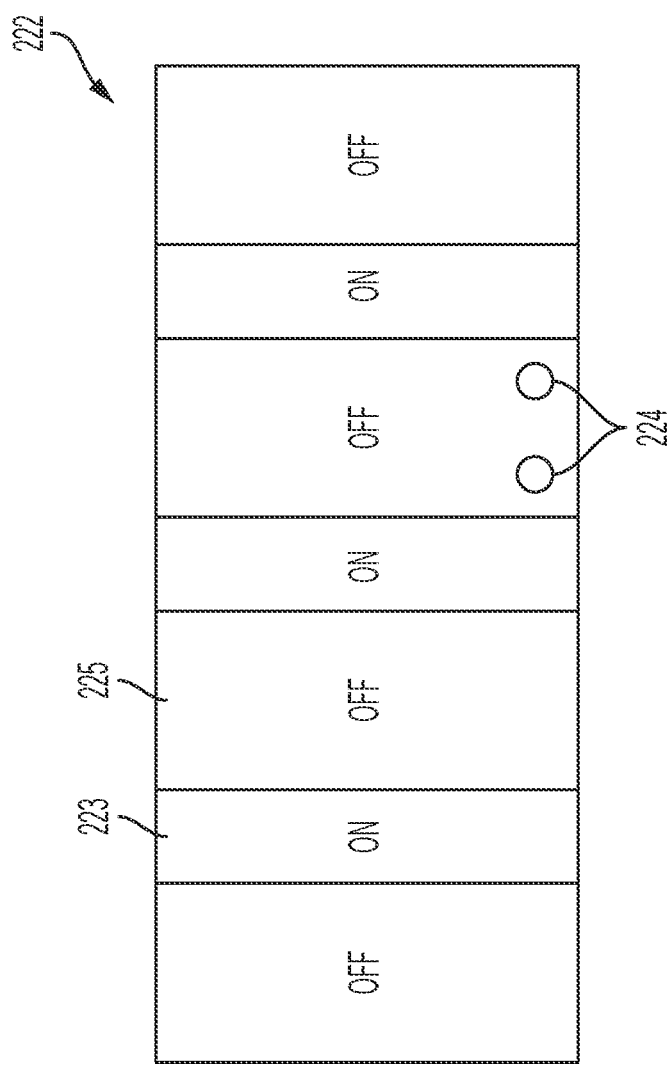
FIG. 3 is a top view of an example vacuum diverter that may be used to block and/or reduce vacuum forces being applied a web.

Vacuum forces may be varied by only providing vacuum boxes under the individual zones of the moving porous member 134 that are intended to receive the vacuum. In other instances, vacuum boxes may be provided under all of the zones, with some of the zones either receiving reduced vacuum or no vacuum. This may be accomplished by turning off the vacuum boxes or reducing the fluid being drawn by the vacuum boxes in the zones intended to receive reduced or no vacuum. Alternatively, vacuum may be drawn under the entire or most of the moving porous member 134 and a vacuum diverter, such as a vacuum blocking plate 222, for example, or other member may be positioned intermediate the vacuum sources or boxes and the moving porous member 134 to eliminate or reduce vacuum from being applied to certain zones of the moving porous member 134. Referring to FIG. 3, an example vacuum blocking plate 222 is illustrated. The vacuum blocking plate 222 may have cut out areas or material free-areas in which vacuum forces may pass ("ON" zones 223) through to the intermediate continuous fiber nonwoven web 200. The vacuum blocking plate 222 may have areas with material that block or reduce vacuum forces from passing ("OFF" zones 225) through to the intermediate continuous fiber nonwoven web 200. The OFF zones applying reduced vacuum forces may define apertures 224, slots, or other holes to allow small vacuum forces to pass to the web 200 to hold the web 200 to the moving porous member 134. As such, the OFF zones may be zones of no vacuum or zones of reduced vacuum.

Figure 4:
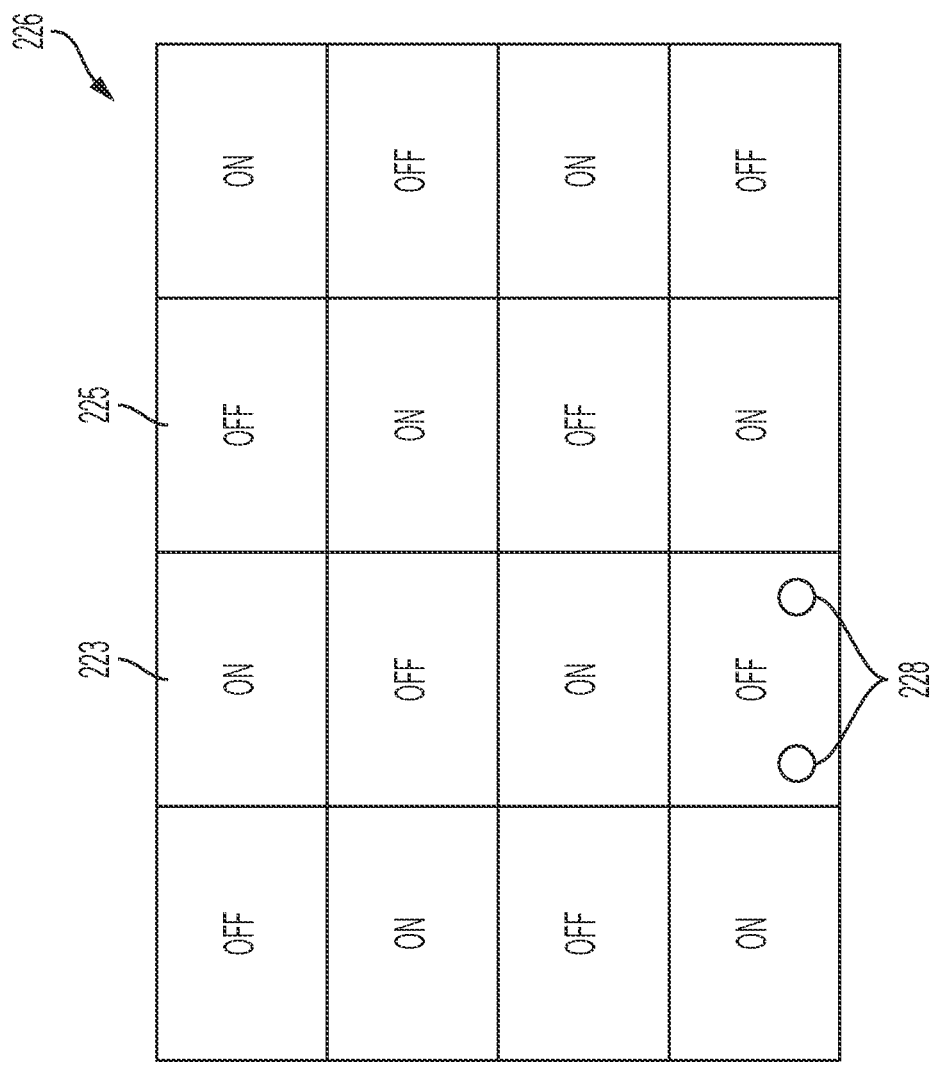
FIG. 4 is a top view of an example vacuum diverter that may be used to block and/or reduce vacuum forces being applied a web.

The vacuum forces may not only be varied in the machine direction. Instead, the vacuum forces may be varied in the cross-machine direction and/or in the machine direction and the cross-machine direction. Referring to FIG. 4, for example, a vacuum blocking plate 226 may have 16 zones or any other suitable number of zones. The zones labeled "ON" 223 may allow a vacuum force to pass to the intermediate continuous fiber nonwoven web 200, while the zones labeled "OFF" 225 may only allow a small vacuum force or no vacuum to pass to the intermediate continuous fiber nonwoven web 200. The on/off (or reduced) zones may vary in the machine direction and the cross-machine direction, for example. The OFF zones 225 applying reduced vacuum forces may define apertures 228, slots, or other holes to allow a small vacuum force to pass to the web 200 to hold the web 200 to the moving porous member 134. As such, the OFF zones may be zones of no vacuum or zones of reduced vacuum.

Figure 5:
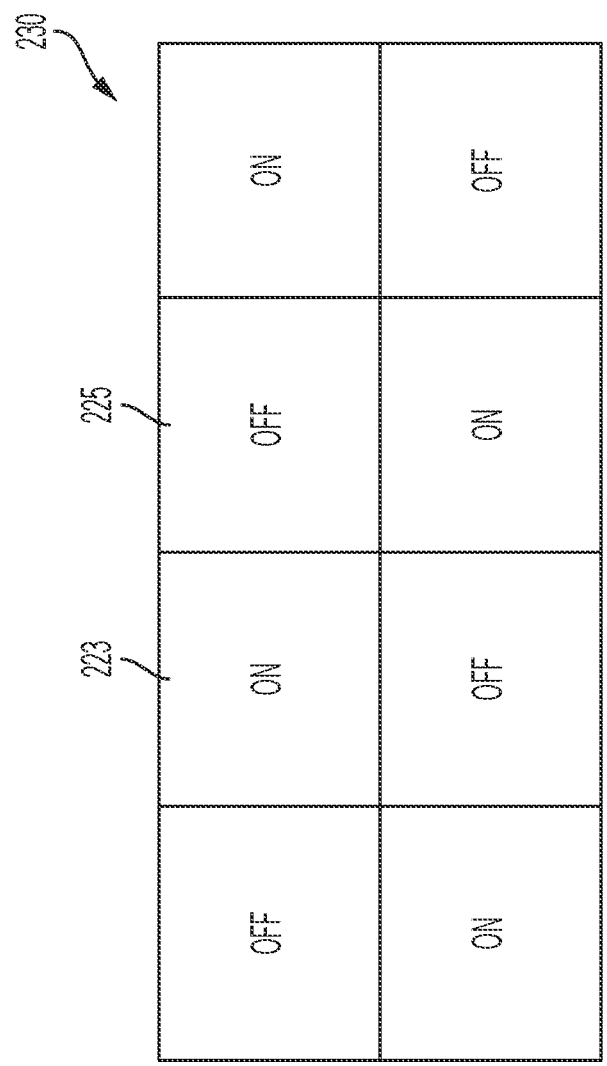
FIG. 5 is a top view of an example vacuum diverter that may be used to block and/or reduce vacuum forces being applied a web.

FIG. 5 illustrates another configuration of a vacuum blocking plate 230 showing eight zones. The ON zones 223 allow vacuum forces to contact the web 200, while the OFF zones 225 allow reduced or no vacuum forces to contact the web 200. The OFF zones of FIG. 5 may also have apertures, slots, or other holes to allow a small vacuum forced to pass to the web 200 to hold the web 200 to the moving porous member 134. As such, the OFF zones may be zones of no vacuum or zones of reduced vacuum.

Referring again to FIG. 2, the web 200 may then be conveyed into the through-fluid bonding oven 144. The through-fluid bonding oven 144 may have multiple zones that heat the web or heat and/or cool the web to allow the continuous fibers to reorient and entangle. The continuous fiber nonwoven web 200 may then be conveyed out of the through-fluid bonding oven 144 to another process, such as winding 232 or further bonding in another through-fluid bonding oven, for example.

The through-fluid bonding oven 144 may take on various configurations, such as flat, omega shaped, single belt, or multiple belts, for example. More than one through-fluid bonding oven may be used. One example configuration is to have a hot fluid supply 217, such as hot air, above the web 200 and a hot fluid vacuum 219 below the web 200. Of course, this configuration could be reversed to provide loft to the web in a direction opposite to the vacuum forces applied during the continuous fiber laydown. The hot fluid may be recycled in the through-fluid bonding oven 144. The hot fluid may travel through the through-fluid bonding oven 144 at a flow rate in the range of about 0.5 m/s to about 5 m/s and at a temperature in the range of about 10 degrees C. to about 280 degrees C., for example. In some instances, it may be desirable to also have cooling within the through-fluid oven to set the fiber-to-fiber bonding. The through-fluid bonding oven belts or porous support members may be preheated in the range of about 5 degrees C. to about 130 degrees C. or about 50 degrees C. to about 130 degrees C. for improved efficiency in bonding.

Figure 6:
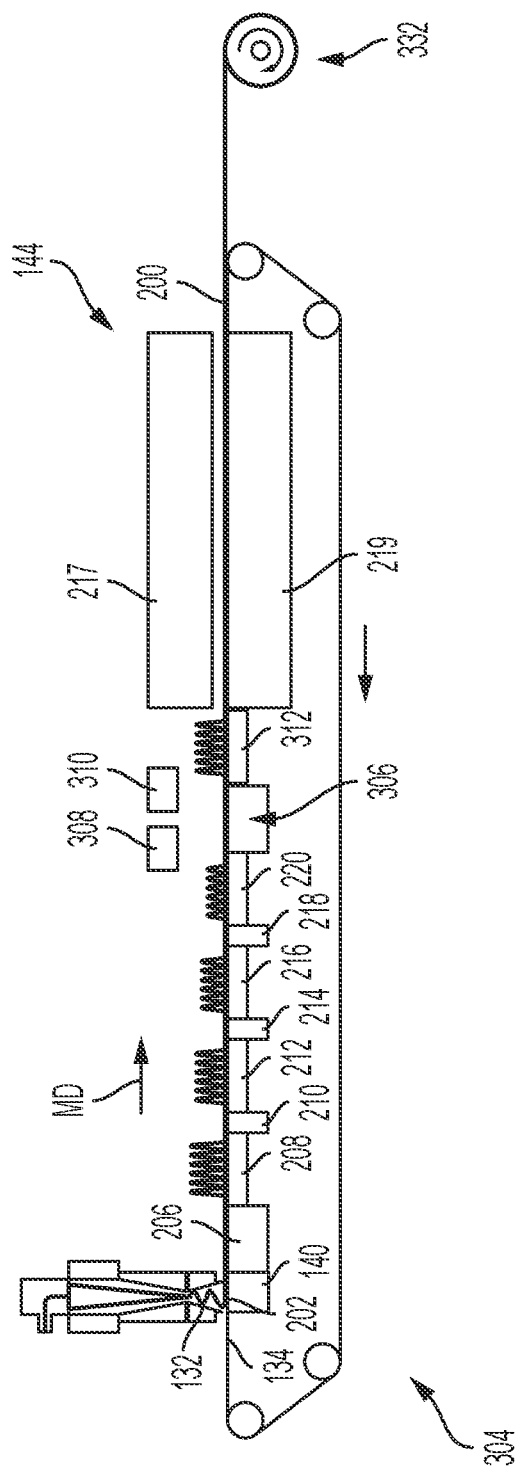
FIG. 6 is a diagrammatic view of an apparatus for performing a process for producing a through-fluid bonded continuous fiber nonwoven web where vacuum forces are intermittently applied to the web and where hot and/or cold fluids are provided to the web.

Referring to FIG. 6, an apparatus 304 for producing a continuous fiber nonwoven web 200 is illustrated. The apparatus 304 is similar to the apparatus 204 of FIG. 2, but also shows additional process steps. In the apparatus 304, the intermediate web of continuous fibers 200 is deposited on the moving porous member 134 in the same or a similar fashion as described with respect to FIGS. 1 and 2. The web 200 may be conveyed through the various vacuum zones as discussed with respect to FIG. 2. The various zones of FIG. 6 are labeled the same as FIG. 2 and perform the same or a similar function. The vacuum blocking plates or vacuum diverters of FIGS. 3-5 may also be used in the various zones, much like the example apparatus 204 of FIG. 2. The apparatus 304, however, applies additional transformations to the web 200 prior to the web 200 entering the through-fluid bonding oven 144 and after the intermittingly varying the vacuum force steps.

First, the apparatus 304 may comprise a temperature variation zone 306. Heating 308 and/or cooling 310 may be applied to the web 200 in the temperature variation zone 306. The heat may be in the form of a heated fluid, such as hot air having a temperature in the range of about 30 degrees C. to about 130 degrees C., for example. An air knife may be an appropriate tool to provide the heat. The heat may be applied to the web 200 while the web 200 is under a vacuum force, a reduced vacuum force, or no vacuum force. The cooling may be in the form of a cooled fluid, such as below ambient temperature air or ambient temperature air having a temperature in the range of about 10 degrees C. to about 25 degrees C., for example. An air knife may be an appropriate tool to provide the cooling. The cooling may be applied to the web 200 while the web 200 is under a vacuum force, a reduced vacuum force, or no vacuum force. The heating step may be performed prior to the cooling step or the cooling step may be performed prior to the heating step. The cooling may be applied to the web 200 while the web 200 is under a vacuum force, a reduced vacuum force, or no vacuum force. The difference in temperature of the heating compared to the cooling being applied to the web 200 may be in the range of about 5 degrees C. to about 10 degrees C., for example. A range of the temperature of the heating may be in the range of about 30 degrees C. to about 130 degrees C., for example. A range of the temperature of the cooling may be in the range of about 10 degrees C. to about 25 degrees C., for example. In some instances, only heating or only cooling may be used.

Heating and/or cooling the web 200 may cause the continuous fibers to reorient thereby creating loft, softness, and structural integrity in the web. After the heating and/or cooling steps, the web 200 may pass through a reduced or no vacuum zone 312 prior to being conveyed into the through-fluid bonding oven 144. The moving porous member 134 and the web 200 may be heated in the reduced or no vacuum zone 312, by a hot fluid or otherwise to preheat the web 200 before entering the through-fluid bonding oven 144. The heating and/or cooling and reduced or no vacuum steps may be repeated any suitable number of times prior to conveying the web 200 into a through-fluid bonding oven or other oven to achieve the desired results of loft, softness, and structural integrity. The continuous fiber nonwoven web 200 may then be conveyed through and out of the through-fluid bonding oven 144 to another process, such as winding 332 or further bonding in another through-fluid bonding oven, for example.

Figure 7:
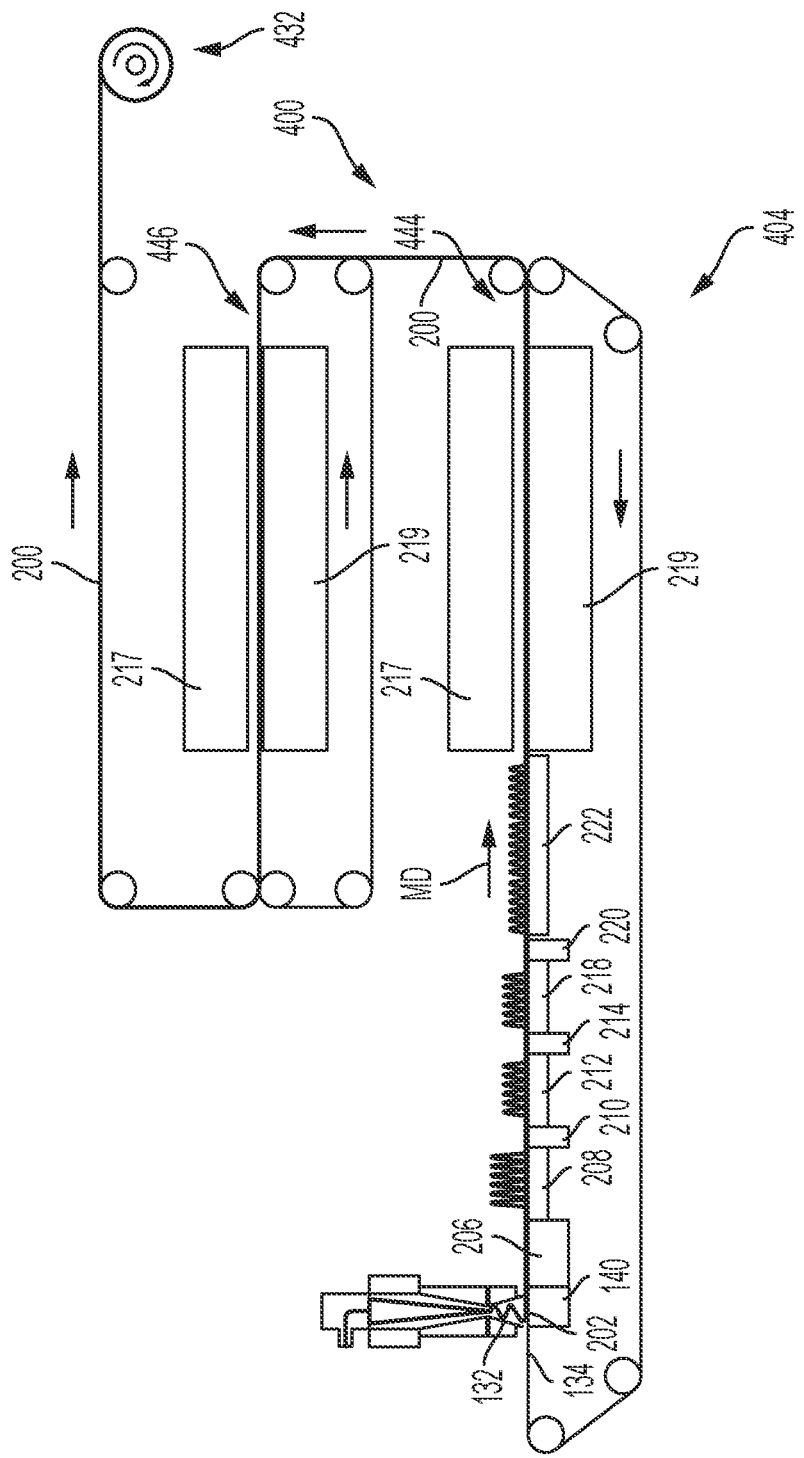
FIG. 7 is a diagrammatic view of an apparatus for performing a process for producing a through-fluid bonded continuous fiber nonwoven web where vacuum forces are intermittently applied to the web, wherein the apparatus may optionally have two through-fluid bonding ovens.

The intermittently varying the vacuum forces on the web 200, potentially in combination with the heating and cooling steps, may provide the web with enough structural integrity and continuous fiber entanglement such that the web may be transferred off the nonwoven manufacturing line with or without a through-fluid bonding step. Referring to FIG. 7, an apparatus 404 for producing a continuous fiber nonwoven web 200 is illustrated. Like numbers from previous FIG. 2 are carried over in FIG. 7 to reflect the same or similar elements, although the apparatus 304 of FIG. 6 could also be used. The web 200 may be able to be partially through-fluid bonded by a first through-fluid bonding oven 444, then transferred over a distance 400 that is free of a through-fluid bonding oven, and then conveyed into a second through-fluid bonding oven 446. The web 200 may be conveyed on the moving porous member 134 over the distance 400 and vacuum forces may be applied to the web 200 to keep the web on the moving porous member 134. The first through-fluid bonding oven 444 oven may be positioned over, under, or to the side of the second through-fluid bonding oven 446 to reduce the footprint of the nonwoven manufacturing line. Conveying the web 200 through separate through-fluid bonding ovens may provide a final web with sufficient structural integrity, continuous fiber entanglement, loft, and softness. The web may be conveyed through three or more through-fluid bonding ovens either on the nonwoven manufacturing line or offline. The through-fluid bonding ovens of FIG. 7 may be the same as, or similar to, the through-fluid bonding oven 144 discussed with respect to FIG. 2. The web 200 may be subjected to winding 432 after being conveyed through the first and second through-fluid bonding ovens 444 and 446.

Figure 8:
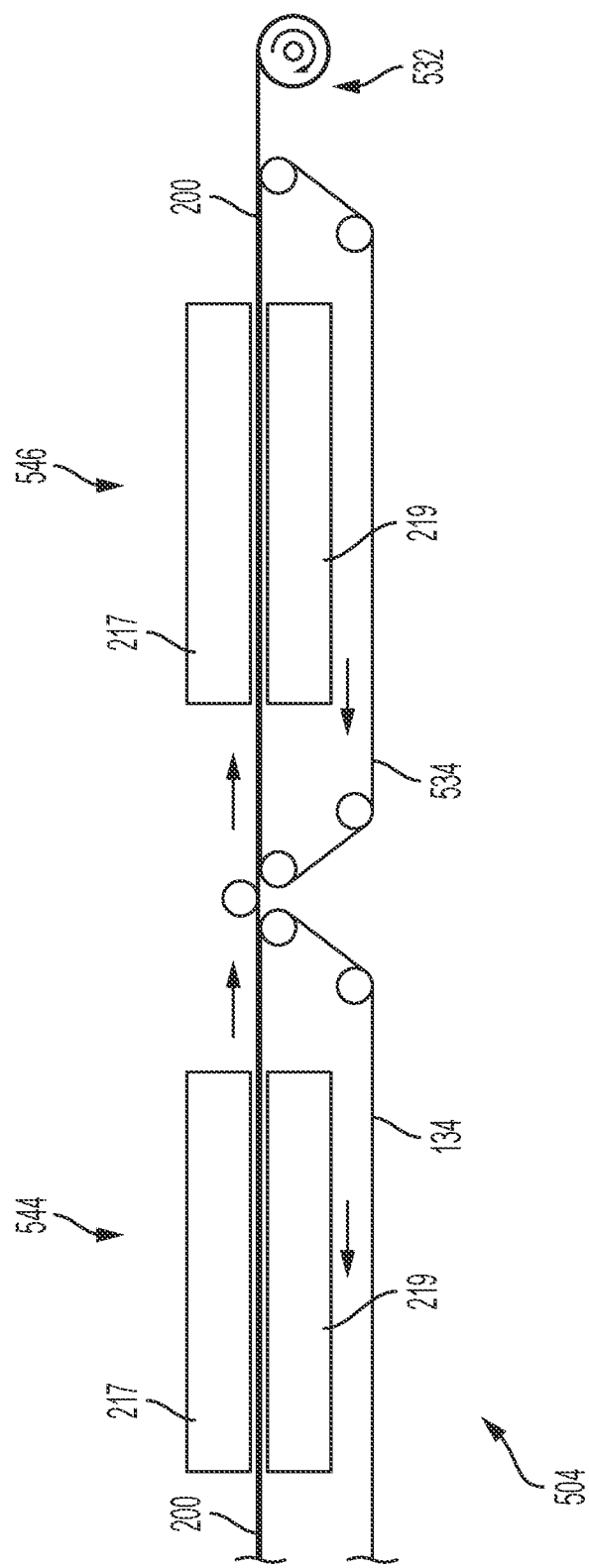
FIG. 8 is a diagrammatic view of an apparatus for through-fluid bonding an intermediate continuous fiber nonwoven web where multiple through-fluid bonding steps may be applied to the web.

Referring to FIG. 8, an apparatus 504 for a through-fluid bonding process is illustrated. The apparatus 504 may optionally comprise a first through-fluid bonding oven 544 (which may be located where the oven 144 is in FIGS. 2 and 6). This first through-fluid bonding oven 544 may be optional if sufficient structural integrity and continuous fiber entanglement is created in the intermediate continuous fiber nonwoven web 200 by the intermittent vacuum forces application and/or the applying heating and cooling steps. Pre-bonding of the web proximate to the first location 202 may also factor into this determination. In such an instance, the web 200 may be able to be transferred off of the moving porous member 134 onto a second moving porous member 534 without or without initial through-fluid bonding. The second moving porous member 534 may be configured to convey the web 200 through a second (or first if the oven 544 is not present) through-fluid bonding oven 546. The second moving porous member 534 may be pre-heated prior to entering the second through-fluid bonding oven 546. The continuous fiber nonwoven web 200 may then be conveyed out of the second through-fluid bonding oven 546 to another process, such as winding 532 or further bonding in another through-fluid bonding oven, for example.

Figure 9:
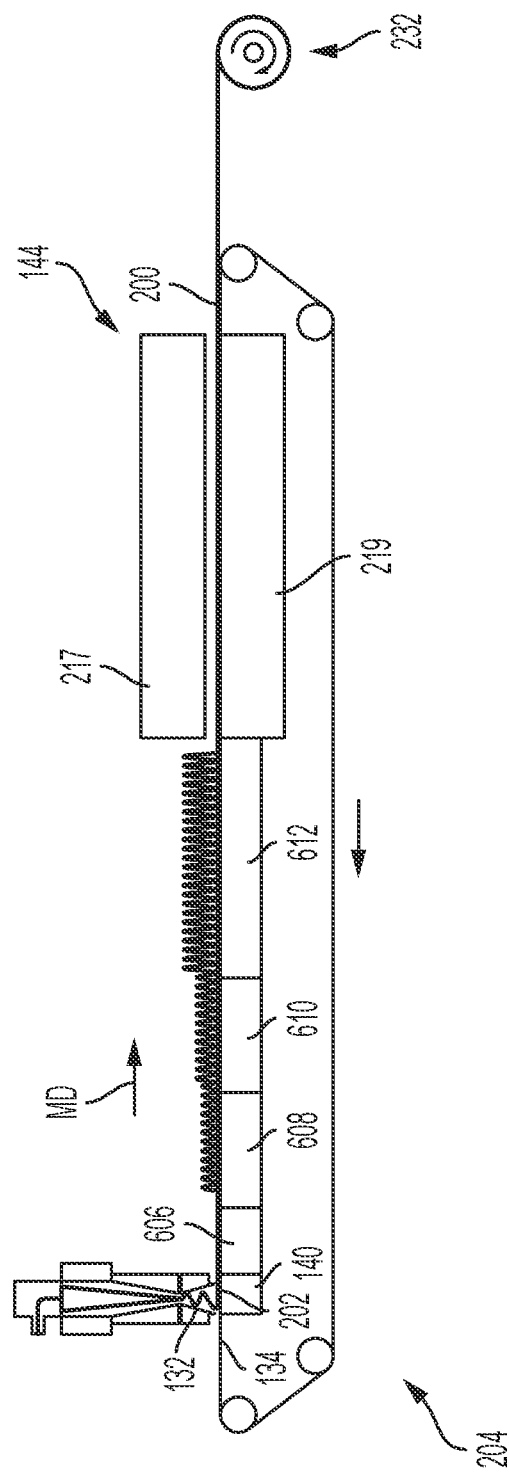
FIG. 9 is a diagrammatic view of an apparatus for performing a process for producing a through-fluid bonded continuous fiber nonwoven web where vacuum forces applied to the web are sequentially decreased.

Intermittently varying the vacuum forces applied to a web as discussed herein with respect to FIGS. 2-7, also may encompass the vacuum forces being always "on", but may be gradually reduced or sequentially decreased as the web travels from the first zone towards the hot fluid supply and the hot fluid vacuum. For example, a first zone may have the greatest vacuum force, the second zone may have a lesser vacuum force than the first zone, a third zone may have a lesser vacuum force than the second zone, a fourth zone may have a lesser vacuum force than the third zone, and so on depending on how many zones are present. This can be accomplished by using slide dampers, variable speed fans, perforated plates, duct tape, and the like. An example of such a process is illustrated in FIG. 9. Like numbers as FIG. 2 in FIG. 9 will mean the same or similar element as discussed herein. In such a configuration, a first zone 606 may have a first vacuum force, a second zone 608 may have a second vacuum force that is less than the first vacuum force, a third zone 610 may have a third vacuum force that is less than the second vacuum force, an optional fourth zone 612 may have a fourth vacuum force that is less than or equal to the third vacuum force, and an optional fifth zone (not illustrated) may have a fifth vacuum force that is less than or equal to the fourth vacuum force. Additional zones downstream of the fifth zone may also be provided and may have vacuum forces that are the same as or less than vacuum forces of the fifth zone. In some instances, zones of no vacuum may be provided intermediate at least some of the various zones 606, 608, 610, and 612. In some forms, the zones downstream of the first zone 606 may reduce vacuum air velocity in the sequence of zones such that the furthest downstream zone is about 4 m/s. In some forms, the zones downstream of the first zone 606 may reduce vacuum air velocity in the sequence of zones such that the furthest downstream zone is about 2 m/s. In some forms, the zones downstream of the first zone 606 may reduce vacuum air velocity in the sequence of zones such that the furthest downstream zone is about 1 m/s. Reducing the vacuum air velocity in such fashion enables fiber crimping and increased loft, thereby resulting in a cushier nonwoven web.

METHODS/EXAMPLES

A method of creating a soft and lofty continuous fiber nonwoven web is provided. The method may comprise providing a first molten polymer and a second molten polymer to a spinneret defining a plurality of orifices. The first molten polymer may have a first melting temperature and the second molten polymer may have a second, different melting temperature. The first melting temperature may be in the range of about 10 degrees to about 180 degrees different than the second melting temperature (including other ranges specified above). The continuous fiber strands may comprise multi-constituent fibers, such as bicomponent fibers, for example. The continuous fiber strands may comprise polyethylene and polypropylene. The continuous fiber strands may comprise polyethylene and polyethylene terephthalate. The continuous fiber strands may comprise polyethylene and polylactic acid. The method may comprise flowing a fluid intermediate the spinneret and a moving porous member. The moving porous member may be positioned below the spinneret. The method may comprise using the fluid to draw or push the first and second molten polymer components, in a direction that is toward the moving porous member, through at least some of the plurality of orifices to form a plurality of individual continuous fiber strands. The method may comprise aspirating the continuous fiber strands intermediate the spinneret and the moving porous member. Alternatively, the method may comprise passing the continuous fiber strands through a venturi intermediate the spinneret and the moving porous member. The method may comprise depositing the continuous fiber strands onto the moving porous member at a first location to produce an intermediate continuous fiber nonwoven web. The intermediate continuous fiber nonwoven web may comprise crimped fibers. The method may comprise allowing at least some of the continuous fibers of the intermediate continuous fiber nonwoven web to crimp on the moving porous member downstream of the first location. The method may comprise intermittently varying a vacuum force applied to the moving porous member and to the intermediate continuous fiber nonwoven web downstream of the first location and without the addition of more continuous fibers and without any heat applied.

The moving porous member may comprises a first zone downstream of the first location, a second zone downstream of the first zone, a third zone downstream of the second zone, and a fourth zone downstream of the third zone. A first vacuum force may be applied to the moving porous member and to the intermediate continuous fiber nonwoven web in the first zone and the third zone. A second vacuum force may be applied to the moving porous member and to the intermediate continuous fiber nonwoven web in the second and fourth zones. The second vacuum force may be less than the first vacuum force. The second vacuum force may be about zero or zero.

The moving porous member may comprise a fifth zone downstream of the fourth zone and a sixth zone downstream of the fifth zone. More than six zones may also be provided, such as ten, 16, or 20 zones, for example. The first vacuum force may be applied to the moving porous member and to the intermediate continuous fiber nonwoven web in the fifth zone. The second vacuum force may be applied to the moving porous member and to the intermediate continuous fiber nonwoven web in the sixth zone.

At least one of the first zone, the second zone, the third zone, the fourth zone, the fifth zone, and the sixth zone may have a different length in a machine direction than at least one other length in the machine direction of the first zone, the second zone, the third zone, the fourth zone, the fifth zone, and the sixth zone. Multiple zones may have the same length. Likewise, multiple zones may have different lengths. The various zones may also have the same width in the cross-machine direction or may have different widths.

The method may comprise blocking the second vacuum force, using a vacuum diverter, such as a vacuum blocking plate, for example, from contact with the intermediate continuous fiber nonwoven web in at least one of the second zone, the fourth zone, and the sixth zone.

The method may comprise through-fluid bonding the intermediate continuous fiber nonwoven web after the intermittently varying the vacuum force step to produce a continuous fiber nonwoven web.

The method may comprise applying heat to the intermediate continuous fiber nonwoven web after the intermittently varying the vacuum force step and before the through-fluid bonding step. The method may comprise applying cooling to the intermediate continuous fiber nonwoven web after the applying heat step or before the applying heat step and before the through-fluid bonding step. The method may comprise reducing or eliminating the vacuum being applied to the moving porous member and to the intermediate continuous fiber nonwoven web after the applying cooling step and/or after the applying heat step and before the through-fluid bonding step. The method may comprise heating the intermediate continuous fiber nonwoven web during the reducing or eliminating the vacuum step.

The method may comprise, after the through-fluid bonding step, conveying the intermediate continuous fiber nonwoven web over a distance without through-fluid bonding, and then second through-fluid bonding the intermediate continuous fiber nonwoven web to produce a continuous fiber nonwoven web.

The method may comprise allowing at least some of the continuous fibers of the intermediate continuous fiber nonwoven web to crimp on the moving porous member proximate to and/or downstream of the first location and upstream of the through-fluid bonding step.

A method of creating a soft and lofty continuous fiber nonwoven web is provided. The method may comprise providing a first molten polymer and a second molten polymer to a spinneret defining a plurality of orifices. The first molten polymer may have a first melting temperature. The second molten polymer may have a second, different melting temperature. The first melting temperature may be in the range of about 10 degrees to about 180 degrees different than the second melting temperature (and other ranges disclosed herein). The continuous fiber strands may comprise multi-constituent fibers, such as bicomponent fibers, for example. The continuous fiber strands may comprise polyethylene and polypropylene. The continuous fiber strands may comprise polyethylene, polyethylene terephthalate, and/or polylactic acid (or any combination of the same). The continuous fiber strands may comprise polyethylene and polylactic acid. The method may comprise flowing a fluid intermediate the spinneret and a moving porous member. The moving porous member may be positioned below the spinneret. The method may comprise using the fluid to draw or push the first and second molten polymer components, in a direction that is toward the moving porous member, through at least some of the plurality of orifices to form a plurality of individual continuous fiber strands. The method may comprise aspirating the continuous fiber strands intermediate the spinneret and the moving porous member. Alternatively, the method may comprise passing the continuous fiber strands through a venturi intermediate the spinneret and the moving porous member. The method may comprise depositing the continuous fiber strands onto the moving porous member at a first location to produce an intermediate continuous fiber nonwoven web. The method may comprise intermittently varying a vacuum force applied to the moving porous member and to the intermediate continuous fiber nonwoven web downstream of the first location and without the addition of more continuous fibers and without any heat applied. The method may comprise through-fluid bonding the web to produce a continuous fiber nonwoven web. After the through-fluid bonding step, the method may comprise conveying the continuous fiber nonwoven web over a distance without through-fluid bonding and second through-fluid bonding the continuous fiber nonwoven web.

A method of creating a soft and lofty continuous fiber nonwoven web is provided. The method may comprise providing a first molten polymer and a second molten polymer to a spinneret defining a plurality of orifices. The first molten polymer may have a first melting temperature. The second molten polymer may have a second melting temperature. The first melting temperature may be in the range of about 10 degrees to about 180 degrees different than the second melting temperature (and other ranges disclosed herein). The continuous fiber strands may comprise multi-constituent fibers, such as bicomponent fibers. The continuous fiber strands may comprise polyethylene and polypropylene. The continuous fiber strands may comprise polyethylene and polyethylene terephthalate. The continuous fiber strands may comprise polyethylene and polylactic acid.

The method may comprise flowing a fluid intermediate the spinneret and a moving porous member. The moving porous member may be positioned below the spinneret. The method may comprise using the fluid to draw or push the first and second molten polymer components, in a direction that is toward the moving porous member, through at least some of the plurality of orifices to form a plurality of individual continuous fiber strands. The method may comprise aspirating the continuous fiber strands intermediate the spinneret and the moving porous member. Alternatively, the method may comprise passing the continuous fiber strands through a venturi intermediate the spinneret and the moving porous member. The method may comprise depositing the continuous fiber strands onto the moving porous member at a first location to produce an intermediate continuous fiber nonwoven web. The method may comprise intermittently varying a vacuum force applied to the moving porous member and to the intermediate continuous fiber nonwoven web downstream of the first location and without the addition of more continuous fibers and without any heat applied. The method may comprise through-fluid bonding the intermediate continuous fiber nonwoven web to produce a continuous fiber nonwoven web.

Example 1

Round bicomponent molten polymers comprising 70% by weight of polyethylene and 30% by weight of polyester terephthalate, in a side-by-side configuration, were extruded vertically downward from a plurality of orifices of a spinneret and at a mass throughput of about 0.4 grams per orifice per minute. The resulting continuous fiber strands were quenched symmetrically by transverse flows of air cooled to about 15 degrees C., drawn by a high-velocity (>25 m/s) air stream down to a fiber diameter of about 17 μm and directed by the air stream onto a moving porous member to create an intermediate continuous fiber nonwoven web on the moving porous member. The moving porous member was located about 2 meters below the spinneret. The intermediate continuous fiber nonwoven web had a basis weight of about 25 gsm. The moving porous member was 156 centimeters long and had ten zones in the machine direction. Table 1 below shows the machine direction length (cm) of the various zones and air flow (m/s) in each zone. For clarity, zone 1 is upstream of zone 2, zone 2 is upstream of zone 3 etc. Also for clarity, air speed is the speed of air flowing down through the moving porous member without the intermediate nonwoven web on the moving porous member as described herein.

TABLE 1

| Zone | Length (cm) | Vacuum (m/s) |
| --- | --- | --- |
| 1 | 10 | 18 |
| 2 | 10 | 10 |
| 3 | 10 | 4 |
| 4 | 15 | 2½ |
| 5 | 10 | 0 |

TABLE 1-continued

| Zone | Length (cm) | Vacuum (m/s) |
| --- | --- | --- |
| 6 | 5 | 5 |
| 7 | 51 | 0 |
| 8 | 5 | 6 |
| 9 | 20 | 0 |
| 10 | 20 | 1¼ |

In zone 10, the intermediate continuous fiber nonwoven web was lightly bonded with air that was heated to about 115 degrees C. using an air heater that was located about 5.5 cm above the moving porous member. The air heater had an air flow rate of about 0.7 m/s. The intermediate continuous fiber nonwoven web was then through-fluid bonded in a through-fluid bonding oven.

Example 2

A process identical to that described above in Example 1 was used to create continuous fiber strands and deposit them onto a moving porous member to create an intermediate continuous fiber nonwoven web having a basis weight of about 25 gsm. The 156-centimeter long moving porous member, however, had only six zones in the machine direction, distinguished either by changes in air flow or presence of an air heater. Table 2 below shows the machine direction length (cm), air flow (m/s) and air heater presence of the various zones. For clarity, zone 1 is upstream of zone 2, zone 2 is upstream of zone 3, zone 3 is upstream of zone 4, etc. Also for clarity, air speed is the speed of air flowing down through the moving porous member without the intermediate nonwoven web on the moving porous member as described herein. Note that the first vacuum force of 15 m/s was sequentially reduced to 1.5 m/s across different zones along the moving porous member.

TABLE 2

| Zone | Length (cm) | Vacuum (m/s) | Air Heater |
| --- | --- | --- | --- |
| 1 | 10 | 15 | No |
| 2 | 10 | 9 | No |
| 3 | 10 | 6 | No |
| 4 | 10 | 2 | No |
| 5 | 76 | 1.5 | No |
| 6 | 40 | 1.5 | 112° C. |

In zone 6, the intermediate continuous fiber nonwoven web was lightly bonded with air that was heated to about 112 degrees C. using an air heater that was located about 6.5 cm above the moving porous member. The air heater had an air flow rate of about 1.5 m/s. The lightly bonded intermediate continuous fiber nonwoven web was then through-fluid bonded in a through-fluid bonding oven, as described herein. Nonwoven webs created in this way achieve better loft, strength, and softness, with better abrasion resistance.

Example 3

A process identical to that described above in Example 1 was used to create continuous fiber strands and deposit them onto a moving porous member to create an intermediate continuous fiber nonwoven web having a basis weight of about 25 gsm. The 156-centimeter long moving porous member, however, had twelve zones in the machine direction, distinguished either by changes in air flow or presence of an air heater. Table 3 below shows the machine direction length (cm), air flow (m/s) and air heater presence of the various zones. For clarity, zone 1 is upstream of zone 2, zone 2 is upstream of zone 3, zone 3 is upstream of zone 4, etc. Also for clarity, air speed is the speed of air flowing down through the moving porous member without the intermediate nonwoven web on the moving porous member as described herein. Note that the intermediate continuous fiber nonwoven web was exposed to several thermal cycles across different zones along the moving porous member.

TABLE 3

| Zone | Length (cm) | Vacuum (m/s) | Air Heater |
|------|-------------|--------------|------------|
| 1 | 10 | 15 | No |
| 2 | 10 | 9 | No |
| 3 | 10 | 6 | No |
| 4 | 10 | 2 | No |
| 5 | 20 | 1.5 | No |
| 6 | 10 | 1.5 | 80° C. |
| 7 | 16 | 1.5 | No |
| 8 | 10 | 1.5 | 80° C. |
| 9 | 20 | 1.5 | No |
| 10 | 10 | 1.5 | 124° C. |
| 11 | 20 | 1.5 | No |
| 12 | 10 | 1.5 | 124° C. |

In zones 6, 8 10 and 12, the intermediate continuous fiber nonwoven web was lightly bonded with air that was heated to either about 80° C. (zones 6 and 8) or about 124° C. (zones 10 and 12) using air heaters located about 6.5 cm above the moving porous member. The air heaters had an air flow rate of about 1.5 m/s. The lightly bonded intermediate continuous fiber nonwoven web was then through-fluid bonded in a through-fluid bonding oven, as described herein. This thermal cycling (or intermittently providing energy, heat, or hot air) in various zones may use a fluid or air having a temperature in the range of about 30 degrees C. to about 130 degrees C., about 50 degrees C. to about 130 degrees C., or about 70 degrees C. to about 130 degrees C., for example. Other temperatures may also be suitable depending on the desired resulting web. The thermal cycling may occur during the intermittently varying the vacuum step or during the vacuum being sequentially decreased. Residence time during each thermal cycle (e.g., in a certain zone) may be in the range of about 0.1 seconds to about 2 seconds, about 0.1 seconds to about 1.5 seconds, or about 0.1 seconds to about 1 second, for example. Nonwoven webs created in this way achieve better loft, strength, and softness, with better abrasion resistance.

A. A method of creating a soft and lofty continuous fiber nonwoven web, the method comprising:

providing a first molten polymer and a second molten polymer to a spinneret defining a plurality of orifices, wherein the first molten polymer has a first melting temperature, wherein the second molten polymer has a second melting temperature, and wherein the first melting temperature is in the range of about 10 degrees C. to about 180 degrees C. different than the second melting temperature;

flowing a fluid intermediate the spinneret and a moving porous member, wherein the moving porous member is positioned below the spinneret;

using the fluid to draw or push the first and second molten polymer components, in a direction that is toward the moving porous member, through at least some of the plurality of orifices to form a plurality of individual continuous fiber strands;

depositing the continuous fiber strands onto the moving porous member at a first location to produce an intermediate continuous fiber nonwoven web;

intermittently varying a vacuum force applied to the moving porous member and to the intermediate continuous fiber nonwoven web downstream of the first location and without the addition of more continuous fibers and without any heat applied;

through-fluid bonding the web to produce a continuous fiber nonwoven web.

after the through-fluid bonding step, conveying the continuous fiber nonwoven web over a distance without further through-fluid bonding; and second through-fluid bonding the continuous fiber nonwoven web.

B. A method of creating a soft and lofty continuous fiber nonwoven web, the method comprising:

providing a first molten polymer and a second molten polymer to a spinneret defining a plurality of orifices, wherein the first molten polymer has a first melting temperature, wherein the second molten polymer has a second melting temperature, and wherein the first melting temperature is in the range of about 10 degrees C. to about 180 degrees C. different than the second melting temperature;

flowing a fluid intermediate the spinneret and a moving porous member, wherein the moving porous member is positioned below the spinneret;

using the fluid to draw or push the first and second molten polymer components, in a direction that is toward the moving porous member, through at least some of the plurality of orifices to form a plurality of individual continuous fiber strands;

depositing the continuous fiber strands onto the moving porous member at a first location to produce an intermediate continuous fiber nonwoven web;

sequentially decreasing a vacuum force applied to the moving porous member and to the intermediate continuous fiber nonwoven web downstream of the first location and without the addition of more continuous fibers and without any heat applied; and through-fluid bonding the web to produce a continuous fiber nonwoven web.

C. The method of Paragraph B, wherein the continuous fiber strands comprise polyethylene and a second polymer component may comprise polylactic acid.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications may be made without departing from the spirit and scope of the present disclosure. It is therefore intended to cover in the appended claims all such changes and modifications that are within the scope of this disclosure.

What is claimed is:

1. A method of creating a soft and lofty continuous fiber nonwoven web, the method comprising:
providing a first molten polymer and a second molten polymer to a spinneret defining a plurality of orifices, wherein the first molten polymer has a first melting temperature, wherein the second molten polymer has a second melting temperature, and wherein the first melting temperature is in the range of about 10 degrees C. to about 180 degrees C. different than the second melting temperature;
flowing a fluid intermediate the spinneret and a moving porous member, wherein the moving porous member is positioned below the spinneret;
using the fluid to draw or push the first and second molten polymer components, in a direction that is toward the moving porous member, through at least some of the plurality of orifices to form a plurality of individual continuous fiber strands;
depositing the continuous fiber strands onto the moving porous member at a first location to produce an intermediate continuous fiber nonwoven web; and
intermittently varying, in different machine direction oriented zones, a vacuum force applied to the moving porous member and to the intermediate continuous fiber nonwoven web downstream of the first location and downstream of a vacuum box under the first location and without the addition of more continuous fibers.

2. The method of claim 1, wherein the moving porous member comprises:
a first zone downstream of the first location;
a second zone downstream of the first zone;
a third zone downstream of the second zone; and
a fourth zone downstream of the third zone;
wherein a first vacuum force is applied to the moving porous member and to the intermediate continuous fiber nonwoven web in the first zone and the third zone;
wherein a second vacuum force is applied to the moving porous member and to the intermediate continuous fiber nonwoven web in the second and fourth zones; and
wherein the second vacuum force is less than the first vacuum force.

3. The method of claim 2, wherein the second vacuum force is about zero.

4. The method of claim 2, wherein the moving porous member comprises:
a fifth zone downstream of the fourth zone; and
a sixth zone downstream of the fifth zone;
wherein the first vacuum force is applied to the moving porous member and to the intermediate continuous fiber nonwoven web in the fifth zone; and
wherein the second vacuum force is applied to the moving porous member and to the intermediate continuous fiber nonwoven web in the sixth zone.

5. The method of claim 2, wherein at least one of the first zone, the second zone, the third zone, and the fourth zone has a different length in the machine direction than at least one other length in the machine direction of the first zone, the second zone, the third zone, and the fourth zone.

6. The method of claim 2, comprising blocking the second vacuum force from contact with the intermediate continuous fiber nonwoven web in at least one of the second zone and the fourth zone.

7. The method of claim 1, comprising:
through-fluid bonding the intermediate continuous fiber nonwoven web after the intermittently varying the vacuum force step to produce a continuous fiber nonwoven web.

8. The method of claim 1, wherein the intermediate continuous fiber nonwoven web comprises crimped fibers.

9. The method of claim 7, comprising:
applying heat to the intermediate continuous fiber nonwoven web after the intermittently varying the vacuum force step and before the through-fluid bonding step.

10. The method of claim 9, comprising:
applying cooling to the intermediate continuous fiber nonwoven web after the applying heat step and before the through-fluid bonding step.

11. The method of claim 10, comprising:
reducing or eliminating the vacuum being applied to the moving porous member and to the intermediate continuous fiber nonwoven web after the applying cooling step and before the through-fluid bonding step.

12. The method of claim 11, comprising:
heating the intermediate continuous fiber nonwoven web during the reducing or eliminating the vacuum step.

13. The method of claim 7, comprising:
after the through-fluid bonding step, conveying the intermediate continuous fiber nonwoven web over a distance without further through-fluid bonding, and then second through-fluid bonding the intermediate continuous fiber nonwoven web to produce a continuous fiber nonwoven web.

14. The method of claim 1, comprising allowing at least some of the continuous fibers of the intermediate continuous fiber nonwoven web to crimp on the moving porous member proximate to or downstream of the first location.

15. The method of claim 1, wherein the continuous fiber strands comprise polyethylene and polypropylene.

16. The method of claim 1, wherein the continuous fiber strands comprise polyethylene, polyethylene terephthalate, and/or polylactic acid.

17. The method of claim 1, comprising aspirating the continuous fiber strands intermediate the spinneret and the moving porous member.

18. The method of claim 1, comprising passing the continuous fiber strands through a venturi intermediate the spinneret and the moving porous member.

19. The method of claim 1, comprising intermittently providing hot air during the intermittently varying the vacuum force step, wherein the hot air is in the range of about 30 degrees C. to about 130 degrees C.

20. A method of creating a soft and lofty continuous fiber nonwoven web, the method comprising:
providing a first molten polymer and a second molten polymer to a spinneret defining a plurality of orifices, wherein the first molten polymer has a first melting temperature, wherein the second molten polymer has a second melting temperature, and wherein the first melting temperature is in the range of about 10 degrees C. to about 180 degrees C. different than the second melting temperature;
flowing a fluid intermediate the spinneret and a moving porous member, wherein the moving porous member is positioned below the spinneret;
using the fluid to draw or push the first and second molten polymer components, in a direction that is toward the moving porous member, through at least some of the plurality of orifices to form a plurality of individual continuous fiber strands;

depositing the continuous fiber strands onto the moving porous member at a first location to produce an intermediate continuous fiber nonwoven web;

intermittently varying, in at least two different zones, a vacuum force applied to the moving porous member and to the intermediate continuous fiber nonwoven web downstream of the first location and downstream of a vacuum box under the first location and without the addition of more continuous fibers;

through-fluid bonding the web to produce a continuous fiber nonwoven web;

after the through-fluid bonding step, conveying the continuous fiber nonwoven web over a distance without further through-fluid bonding; and second through-fluid bonding the continuous fiber nonwoven web.

21. A method of creating a soft and lofty continuous fiber nonwoven web, the method comprising:

providing a first molten polymer and a second molten polymer to a spinneret defining a plurality of orifices, wherein the first molten polymer has a first melting temperature, wherein the second molten polymer has a second melting temperature, and wherein the first melting temperature is in the range of about 10 degrees C. to about 180 degrees C. different than the second melting temperature;

flowing a fluid intermediate the spinneret and a moving porous member, wherein the moving porous member is positioned below the spinneret;

using the fluid to draw or push the first and second molten polymer components, in a direction that is toward the moving porous member, through at least some of the plurality of orifices to form a plurality of individual continuous fiber strands;

depositing the continuous fiber strands onto the moving porous member at a first location to produce an intermediate continuous fiber nonwoven web;

sequentially decreasing, in different machine direction oriented zones, a vacuum force applied to the moving porous member and to the intermediate continuous fiber nonwoven web downstream of the first location and downstream of a vacuum box under the first location and without the addition of more continuous fibers; and through-fluid bonding the web to produce a continuous fiber nonwoven web.

22. The method of claim 21, wherein the continuous fiber strands comprise polyethylene and a second polymer component comprising polylactic acid.

23. The method of claim 21, wherein the moving porous member comprises:
   a first zone downstream of the first location; and
   a second zone downstream of the first zone;
   wherein the vacuum force is sequentially decreased from the first zone to the second zone.

24. The method of claim 23, wherein the moving porous member comprises:
   a third zone downstream of the second zone; and
   a fourth zone downstream of the third zone;
   wherein the vacuum force is sequentially decreased from the third zone to the fourth zone.

25. The method of claim 24, wherein at least one of the first zone, the second zone, the third zone, and the fourth zone has a different length in the machine direction than at least one other length in the machine direction of the first zone, the second zone, the third zone, and the fourth zone.

26. The method of claim 21, wherein the intermediate continuous fiber nonwoven web comprises crimped fibers.

27. The method of claim 21, comprising:
   applying heat to the intermediate continuous fiber nonwoven web after the sequentially decreasing the vacuum force step and before the through-fluid bonding step.

28. The method of claim 27, comprising:
   applying cooling to the intermediate continuous fiber nonwoven web after the applying heat step and before the through-fluid bonding step.

29. The method of claim 28, comprising:
   reducing or eliminating the vacuum being applied to the moving porous member and to the intermediate continuous fiber nonwoven web after the applying cooling step and before the through-fluid bonding step.

30. The method of claim 29, comprising:
   heating the intermediate continuous fiber nonwoven web during the reducing or eliminating the vacuum step.

* * * * *